(12) United States Patent
Sawada et al.

(10) Patent No.: US 7,764,468 B2
(45) Date of Patent: Jul. 27, 2010

(54) METHOD FOR REMOVING SMEAR AND MAGNETIC RECORDING/REPRODUCING APPARATUS WITH FUNCTION OF REMOVING SMEAR

(75) Inventors: Yoshikazu Sawada, Tokyo (JP); Norio Takahashi, Tokyo (JP); Masaru Hirose, Tokyo (JP); Mitsuo Otsuki, Tokyo (JP); Shoji Toyoda, Hong Kong (CN); Anthony Wai Yuen Lai, Hong Kong (CN)

(73) Assignees: TDK Corporation, Tokyo (JP); SAE Magnetics (H.K.) Ltd., N.T. Hong Kong (CN)

( * ) Notice: Subject to any disclaimer, the term of this patent is extended or adjusted under 35 U.S.C. 154(b) by 749 days.

(21) Appl. No.: 11/735,624

(22) Filed: Apr. 16, 2007

(65) Prior Publication Data

US 2008/0251099 A1    Oct. 16, 2008

(51) Int. Cl.
G11B 5/33 (2006.01)
G11B 5/03 (2006.01)
(52) U.S. Cl. .................................. 360/313; 360/66
(58) Field of Classification Search .............. None
See application file for complete search history.

(56) References Cited

U.S. PATENT DOCUMENTS 5,436,776 A * 7/1995 Kurokawa ............... 360/97.03

FOREIGN PATENT DOCUMENTS

| JP | 2000-242917 | 9/2000 |
|----|-------------|--------|
| JP | 2004-249375 | 9/2004 |
| JP | 2004-355740 | 12/2004 |
| JP | 2006-134905 | 5/2006 |

* cited by examiner

Primary Examiner—K. Wong
(74) Attorney, Agent, or Firm—Oblon, Spivak, McClelland, Maier & Neustadt, L.L.P.

(57) ABSTRACT

Provided is a smear-removing method that can remove smear of a manufactured thin-film magnetic head. The method is performed to a thin-film magnetic head including an MR effect element for reading data having two electrode layers sandwiching an MR effect multilayer as a magneto-sensitive portion therebetween. The method comprises the step of applying a stress voltage less than a breaking voltage of the MR effect element between the two electrode layers to burn off smear. In the method, it is preferable that the stress voltage is applied while an electric resistance or an output voltage of the MR effect element is measured, and the stress voltage is increased until the value of the electric resistance or the output voltage reaches an upper limit specified value specified from a value of an electric resistance or an output voltage in a normal case where smear is not present.

24 Claims, 12 Drawing Sheets

TRACK WIDTH DIRECTION

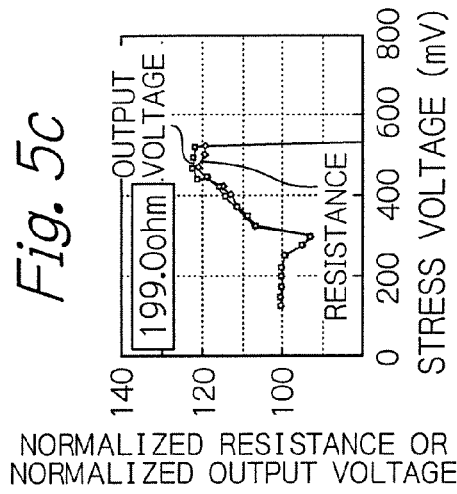
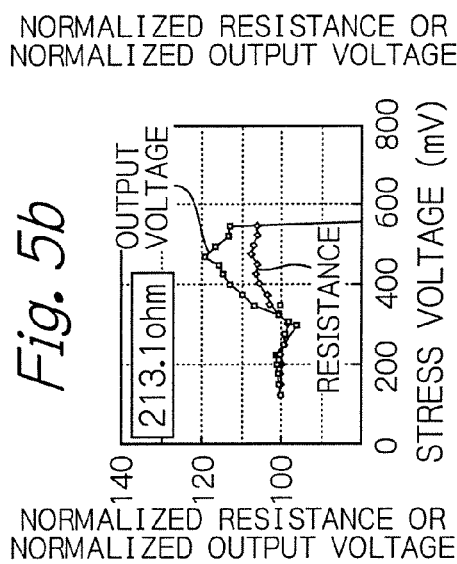
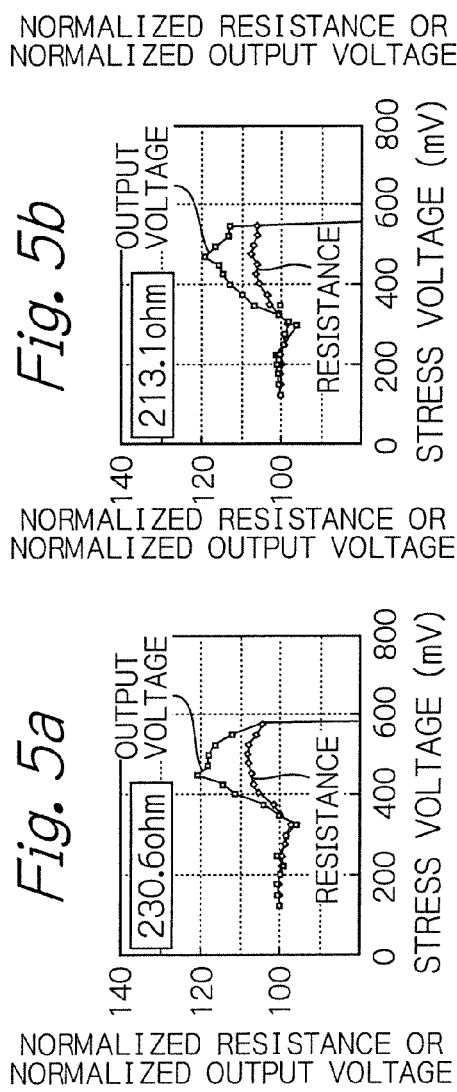
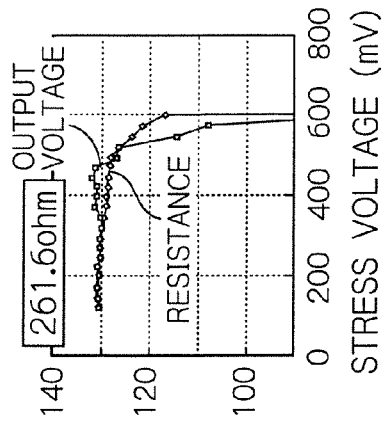
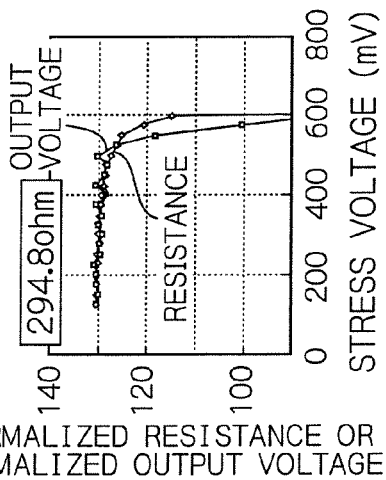
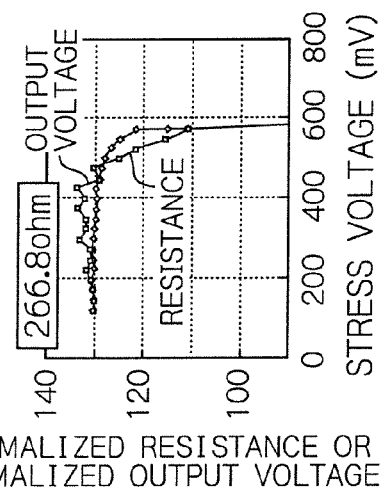

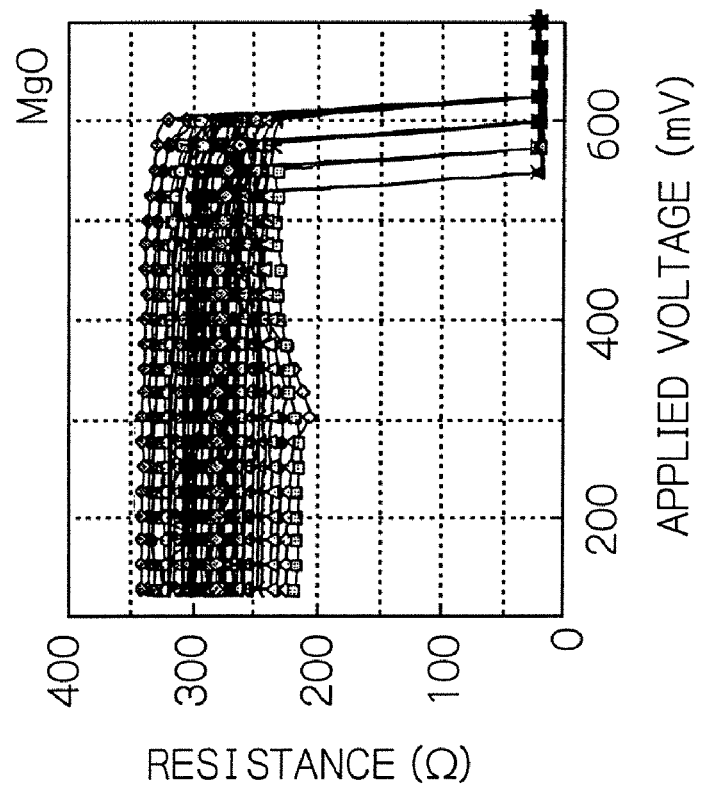
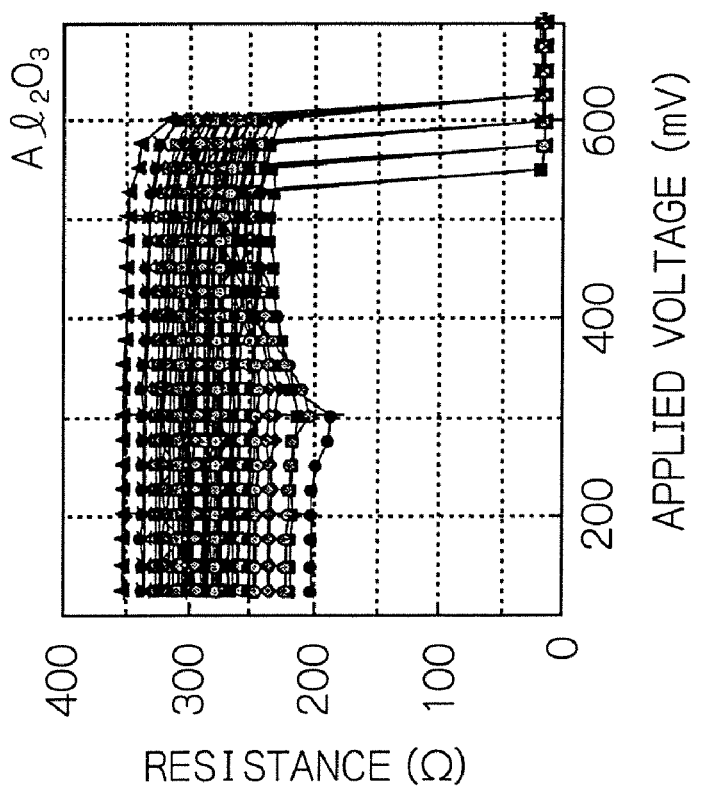
Fig. 6a
Fig. 6b

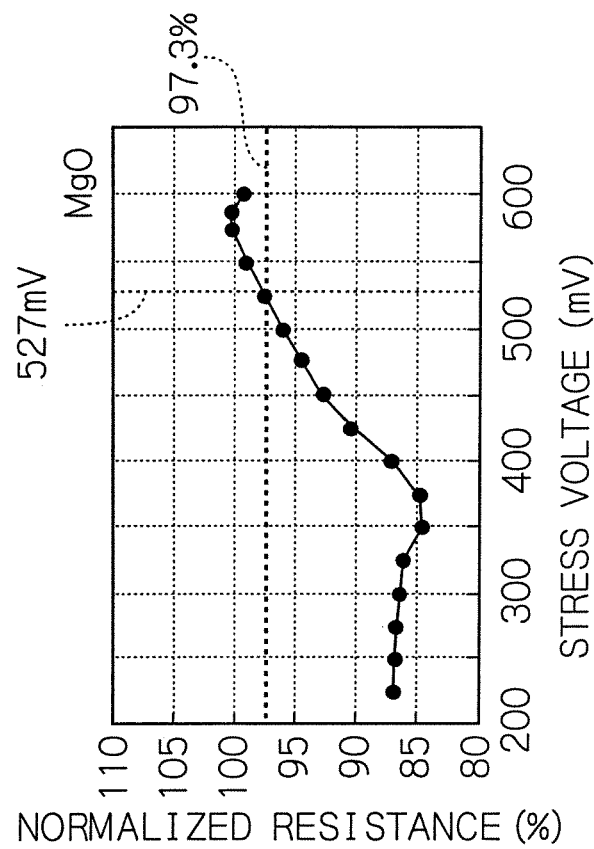
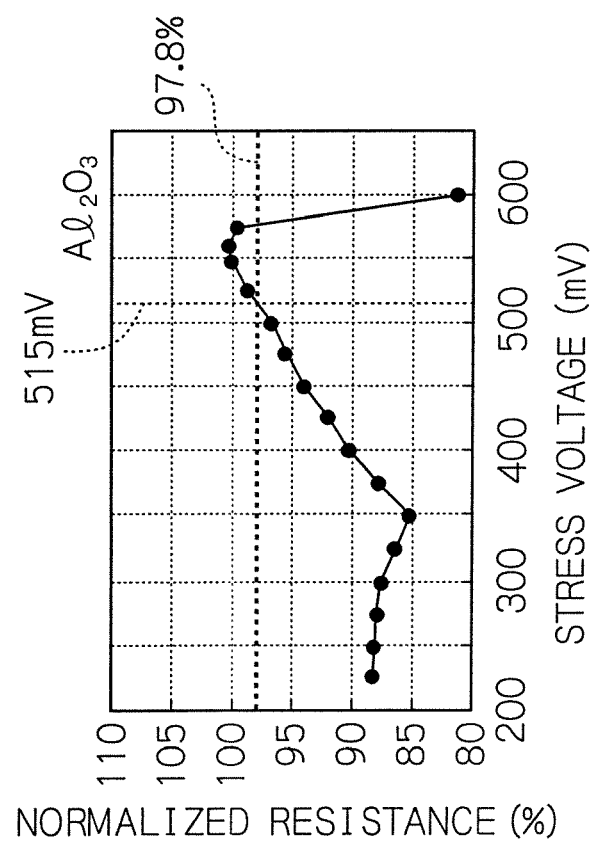
Fig. 6d
Fig. 6c

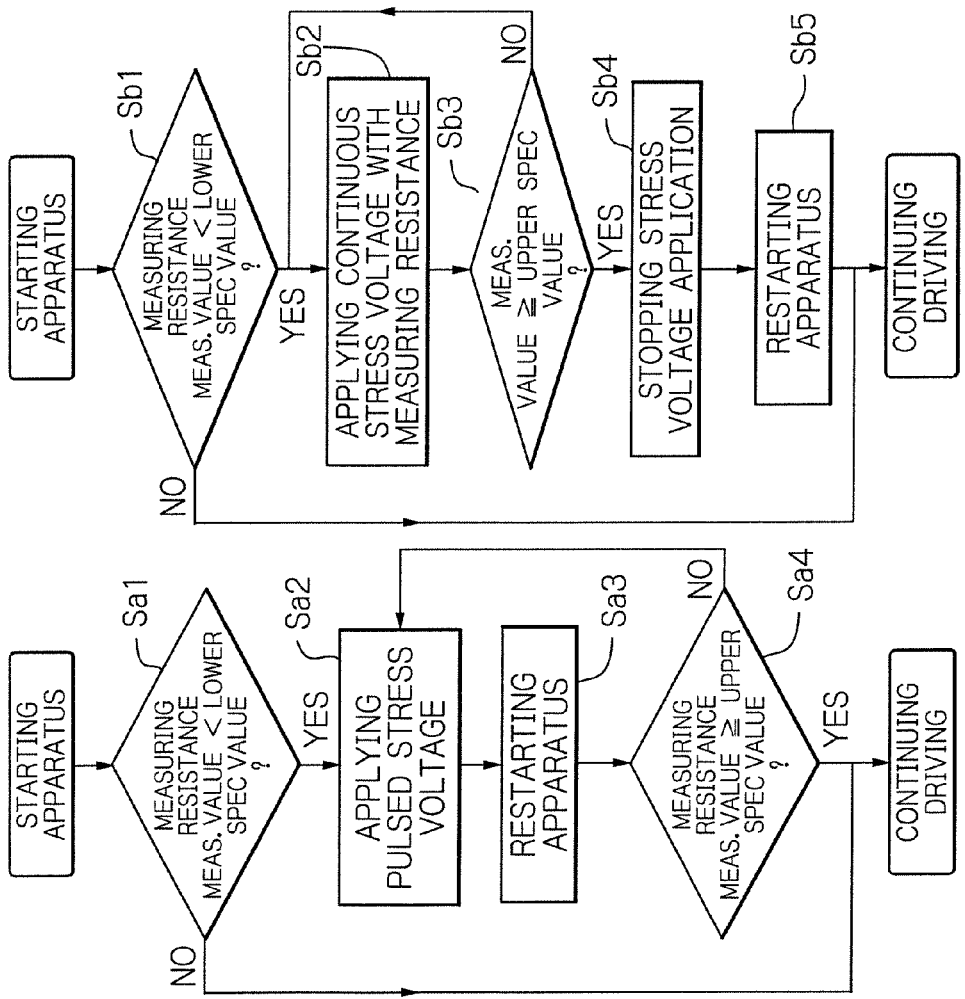

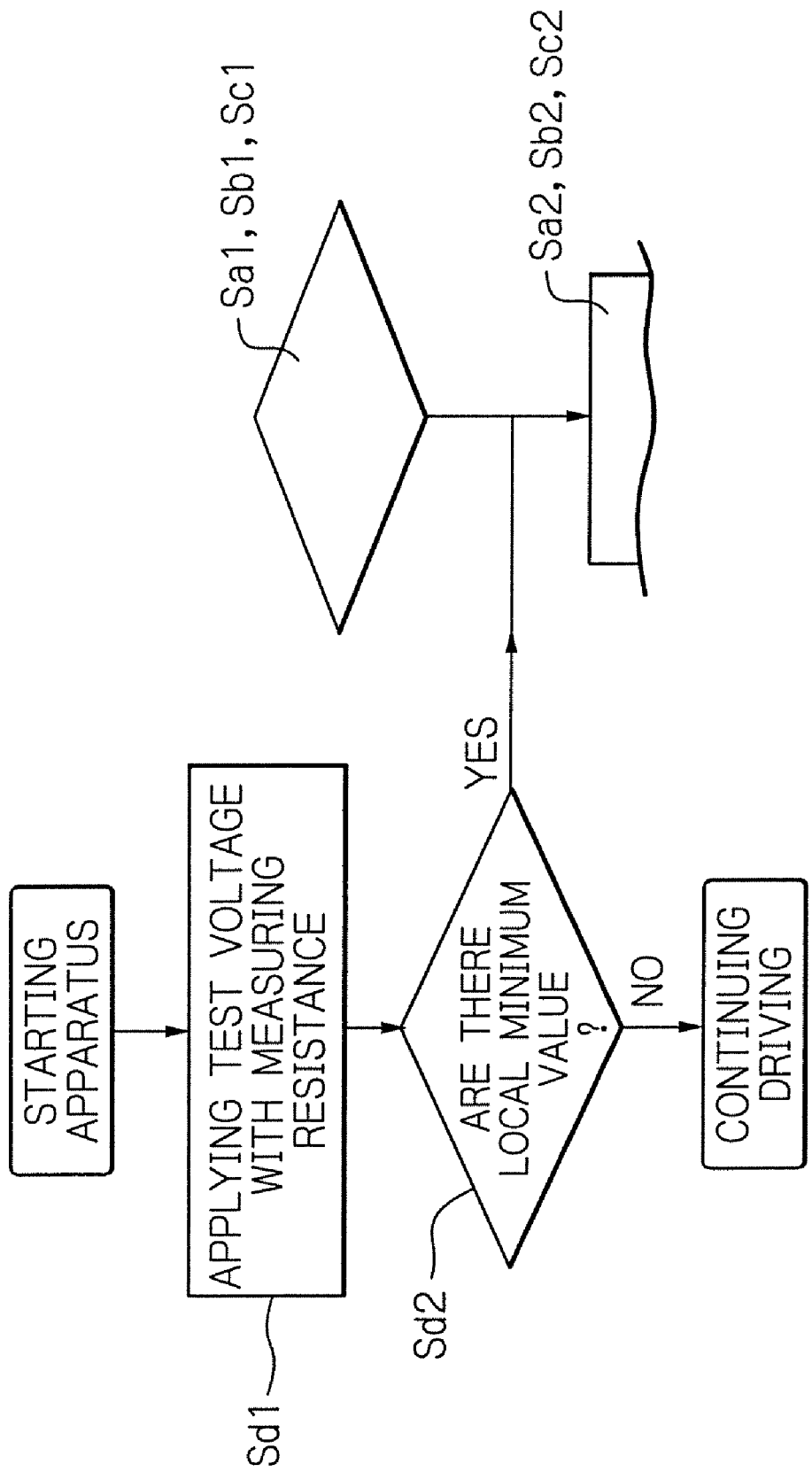

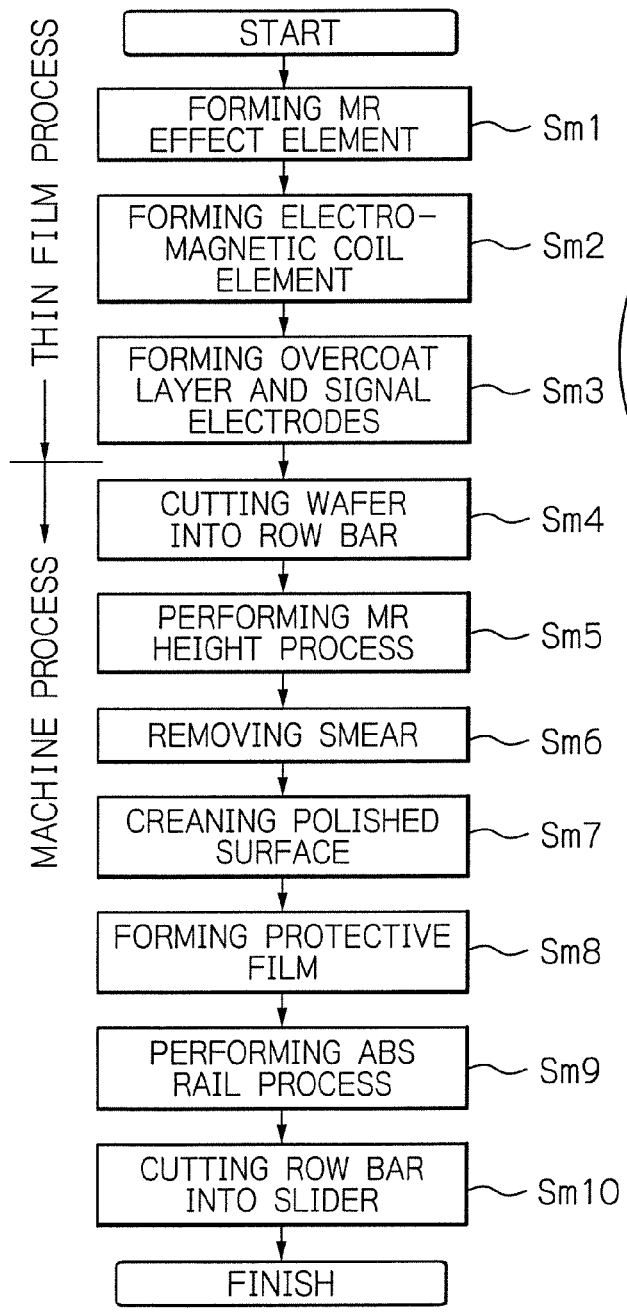
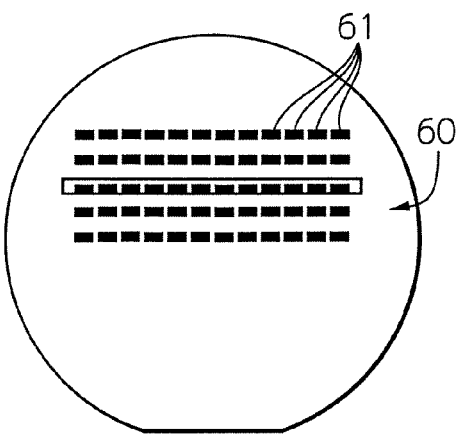
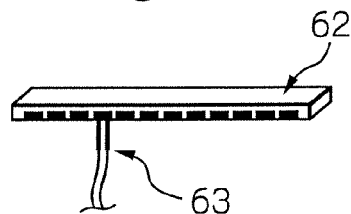

METHOD FOR REMOVING SMEAR AND MAGNETIC RECORDING/REPRODUCING APPARATUS WITH FUNCTION OF REMOVING SMEAR

BACKGROUND OF THE INVENTION

1. Field of the Invention

The present invention relates to a method for removing smear in a magnetoresistive (MR) effect element that a thin-film magnetic head includes for reading data. The invention also relates to a backup method of data using the removing method and a manufacturing method of a thin-film magnetic head using the removing method. Further, the present invention relates to a magnetic recording/reproducing apparatus with the function of removing smear.

2. Description of the Related Art

In recent years, with increase in capacity and reduction in size of magnetic recording/reproducing apparatuses, especially, magnetic disk drive apparatuses, higher sensitivity and larger output are required in thin-film magnetic heads. In order to respond to the requirement, a giant magnetoresistive (GMR) effect and a tunnel magnetoresistive (TMR) effect from which very high resistance-change rate can be expected are used for reading data. Thin-film magnetic heads provided with a current-perpendicular-to-plane (CPP) GMR effect elements or TMR effect elements having a CPP structure for high recording density is positively being developed.

The CPP structure is a structure which passes a sense current perpendicular to stacked surfaces of an MR effect multilayer which is a magneto-sensitive portion. In this structure, two shield layers sandwiching the MR effect multilayer therebetween play a role of electrodes. On the other hand, in a current-in-plane (CIP) GMR effect element and an anisotropic MR effect element having a conventional CIP structure, a sense current flows in the in-plane direction of the stacked surfaces of an MR effect multilayer. In this case, the two shield layers have to be insulated from the MR effect multilayer. Currently, narrowing of a read gap corresponding to high recording density easily causes an insulation failure between the shield layers and the MR effect multilayer in this CIP structure, which becomes a serious problem. On the contrary, in the CPP structure, the shield layers themselves are used as electrodes, and therefore, such a problem does not essentially occur. Therefore, the CPP structure is regarded as being more advantageous than the CIP structure in enhancement in recording density.

In the MR effect element having the CPP structure, occurrence of smear is one of the factors which reduce manufacture yield of thin-film magnetic heads. Polished marks (scars) remain on an air bearing surface (ABS) of a thin-film magnetic head or a head end surface on the ABS side on the occasion of polish as an MR height process step of a head manufacturing process. If the polished marks are formed to reach the end of the MR effect element reaching the head end surface on the ABS side, in some cases, a part of the end of the electrode layer (shield layer) or a part of the end of the MR effect multilayer may be trailed, and the inside of the MR effect multilayer or the MR effect multilayer and the electrode layer may be electrically short-circuited. The scar that causes the short-circuit becomes smear. Such smear has a possibility to cause substantial reduction in a sense current, and to bring about a defective of which read output does not satisfy the reference.

Further, smear can occur due to contact or crash of a thin-film magnetic head and a magnetic recording medium. Specifically, a scratch is formed on the ABS or the head end surface on the ABS side due to such contact or crash, and a part of the electrode layer end or a part of the end of the MR effect multilayer may be similarly trailed in some cases, and the inside of the MR effect multilayer or the MR effect multilayer and the electrode layer may be electrically short-circuited. The scar that causes the short-circuit also becomes smear. Such smear also has a possibility to cause substantial decrease in a sense current and to bring about an error of reduction in read output.

As a method for detecting the smear, for example, Japanese Patent Publication No. 2004-355740A discloses the technique of measuring the electric resistance value between an R+ or R− pad and an S pad provided on a slider (thin-film magnetic head), and determining that smear is present when the measured value is 1 k$\Omega$ or less. Further, as a machining process during manufacturing, which prevents occurrence of smear, Japanese Patent Publication 2004-249375A discloses lapping process which combines a main rocking motion and a subsidiary rocking motion. Further, as a machining process during manufacturing, which removes smear, Japanese Patent Publication No. 2000-242917A discloses the technique of removing smear by performing polishing with special slurry.

However, in these prior arts, smear that occurs during the use of a manufactured thin-film magnetic head cannot be removed. It is actually impossible to apply machining process as described above to a thin-film magnetic head provided within a magnetic recording/reproducing apparatus, and even if machining process is performed by taking out the head, the considerable number of process steps are required. Further, in the case of removing smear in the manufacturing process of a head, the smear is desired to be removed without going through the process which takes much time and effort and requires special adjustment as polishing disclosed in the above-described Japanese Patent Publication No. 2000-242917A.

BRIEF SUMMARY OF THE INVENTION

Accordingly, an object of the present invention is to provide a smear-removing method that can remove smear of a manufactured thin-film magnetic head, and a backup method of data using the removing method.

Another object of the present invention is to provide a magnetic recording/reproducing apparatus with a function of removing smear of a thin-film magnetic head provided therein.

Before describing the present invention, terms used herein will be defined. In a multilayer structure formed on/above the element formation surface of a substrate in a thin-film magnetic head, a layer or a portion of the layer located closer to the substrate (the element formation surface) than a standard layer is referred to as being located "lower" than, "beneath" or "below" the standard layer, and a layer or a portion of the layer located on the opposite side to the substrate (the element formation surface) or on the stacking direction side in relation to a standard layer is referred to as being located "upper" than, "on" or "above" the standard layer.

According to the present invention, provided is a method for removing smear in a thin-film magnetic head including an MR effect element for reading data having two electrode layers sandwiching an MR effect multilayer as a magneto-sensitive portion therebetween, which comprises the step of applying a stress voltage less than a breaking voltage of the MR effect element between the two electrode layers to burn off smear. The just-described method enables the smear to be surely removed without fear of breaking the element.

In the method for removing smear, it is preferable that the stress voltage is applied while an electric resistance or an output voltage of the MR effect element is measured, and the stress voltage is increased until the value of the electric resistance or the output voltage reaches an upper limit specified value specified from a value of an electric resistance or an output voltage in a normal case where smear is not present. In this case, when a nonmagnetic intermediate layer of the MR effect element includes alumina, the upper limit specified value is preferably set to be a value which is at least 97.8% of the value of the electric resistance or the output voltage in the normal case where smear is not present. While when a nonmagnetic intermediate layer of the MR effect element includes magnesia, the upper limit specified value is preferably set to be a value of at least 97.3% of the value of the electric resistance or the output voltage in the normal case where smear is not present. By adopting the just-described modes of applying the stress voltage, smear can be removed more surely.

Further, in these modes, when a nonmagnetic intermediate layer of the MR effect element includes alumina, the stress voltage is preferably set to be 515 mV or less. While when a nonmagnetic intermediate layer of the MR effect element includes magnesia, the stress voltage is preferably set to be 527 mV or less.

Further, in the above-described method for removing smear, it is preferable that the method further comprises the step of measuring an electric resistance or an output voltage of the MR effect element before applying the stress voltage, and the stress voltage is applied between the two electrode layers of the MR effect element when a value of the measured electric resistance or output voltage is smaller than a lower limit specified value specified from a value of an electric resistance or an output voltage in a normal case where smear is not present. In the case, the lower limit specified value is preferably set to be a value of 93% of the value of the electric resistance or the output voltage in the normal case where smear is not present. By the above judgment, the presence or absence of smear can be determined, and smear removing operation can be performed only to the element adjudged that smear is present.

Further, in these cases, the stress voltage is preferably a continuous voltage which increases in value with time, or the stress voltage is preferably a voltage in a pulse form.

According to the present invention, further provided is a backup method of data, using a thin-film magnetic head which includes an MR effect element for reading data having two electrode layers sandwiching an MR effect multilayer as a magneto-sensitive portion therebetween, and cannot read data normally due to occurrence of smear, which comprises the steps of: applying a stress voltage less than a breaking voltage of the MR effect element, and removing the smear by burning the smear off; reading data by using the thin-film magnetic head from which smear is removed; and storing the read data in a magnetic disk drive apparatus or a memory for backup.

According to the present invention, a magnetic recording/reproducing apparatus is further provided, which comprises:
at least one magnetic recording medium;
at least one HGA in which a thin-film magnetic head is attached to an end portion of the HGA itself, the thin-film magnetic head including an MR effect element which is provided for reading data from the at least one magnetic recording medium and has two electrode layers sandwiching an MR effect multilayer as a magneto-sensitive portion therebetween;

a voltage-applying and resistance-measuring circuit for applying a stress voltage for removing smear between the two electrode layers, and for measuring an electric resistance or an output voltage of the MR effect element;
a judging circuit for judging necessity, a starting time or a finishing time of the stress voltage application, based on a measurement result of the electric resistance or the output voltage in the voltage-applying and resistance-measuring circuit; and
a controller for receiving the judgment result in the judging circuit, outputting information of a value of the electric resistance or the output voltage of the MR effect element, error information due to smear and information of smear removing to an outside through an interface, and controlling the voltage-applying operation and the resistance-measuring operation of the voltage-applying and resistance-measuring circuit.

In the magnetic recording/reproducing apparatus, it is preferable that the voltage-applying and resistance-measuring circuit applies the stress voltage while measuring an electric resistance or an output voltage between the two electrode layers, the judging circuit judges whether or not a value of the electric resistance or the output voltage reaches an upper limit specified value specified from a normal value of an initial electric resistance or output voltage, and the controller instructs the voltage-applying and resistance-measuring circuit to finish application of the stress voltage, when the controller receives judgment that the value of the electric resistance or the output voltage reaches the upper limit specified value. Further, in the case, it is also preferable that a nonmagnetic intermediate layer of the MR effect element includes alumina, and the upper limit specified value is at least 97.8% of a value of an electric resistance or an output voltage in a normal case where smear is not present. Or it is also preferable that a nonmagnetic intermediate layer of the MR effect element includes magnesia, and the upper limit specified value is at least 97.3% of a value of an electric resistance or an output voltage of a normal case where smear is not present.

Further, in these cases, it is also preferable a nonmagnetic intermediate layer of the MR effect element includes alumina, and the stress voltage is 515 mV or less. Or it is also preferable that a nonmagnetic intermediate layer of the MR effect element includes magnesia, and the stress voltage is 527 mV or less.

Further, it is preferable that the voltage-applying and resistance-measuring circuit measures the electric resistance or the output voltage of the MR effect element before applying the stress voltage, the judging circuit judges whether or not a value of the electric resistance or the output voltage is smaller than a lower limit specified value specified from a normal value of an initial electric resistance or output voltage, and the controller instructs the voltage-applying and resistance-measuring circuit to start application of the stress voltage when the controller receives judgment that the value of the electric resistance or the output voltage is smaller than the lower limit specified value. In the case, the lower limit specified value is preferably a value of 93% of a value of an electric resistance or an output voltage in a normal case where smear is not present.

Further, in the magnetic recording/reproducing apparatus, it is preferable that the stress voltage which the voltage-applying and resistance-measuring circuit applies is a continuous voltage which increases in value with time. Or it is preferable that the stress voltage which the voltage-applying and resistance-measuring circuit applies is a voltage in a pulse form.

Further, in the magnetic recording/reproducing apparatus, it is preferable that the voltage-applying and resistance-measuring circuit applies the stress voltage between the two electrode layers of the MR effect element which cannot read data due to occurrence of smear, and removes the smear, the MR effect element from which smear is removed reads the data, and the controller transmits the read data to a magnetic disk drive apparatus or a memory for backup. Further, it is also preferable that the magnetic recording/reproducing apparatus comprises a voltage-application switch connected to the voltage-applying and resistance-measuring circuit, for instructing the voltage-applying and resistance-measuring circuit to perform a voltage-applying operation or a resistance-measuring operation from an outside. Further, the MR effect element is preferably a TMR effect element.

Further objects and advantages of the present invention will be apparent from the following description of preferred embodiments of the invention as illustrated in the accompanying figures. In each figure, the same element as that shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIGS. 5a to 5f show graphs representing the examples of measuring the electric resistance and the output voltage of the MR effect element when a stress voltage is actually applied to the element;

FIGS. 6a and 6b show graphs representing the results of measuring the element breaking voltage in the TMR effect elements of various specifications;

FIGS. 6c and 6d show graphs representing the average relationship between the stress voltage and the electric resistance in the elements in which smear exists;

FIGS. 7a to 7d show flowcharts illustrating various embodiments in the method for removing smear according to the present invention;

FIGS. 8a to 8c show a flowchart and schematic views showing one mode in which the method for removing smear according to the present invention is applied to a manufacturing method of a thin-film magnetic head.

DETAILED DESCRIPTION OF THE INVENTION

Figure 1:
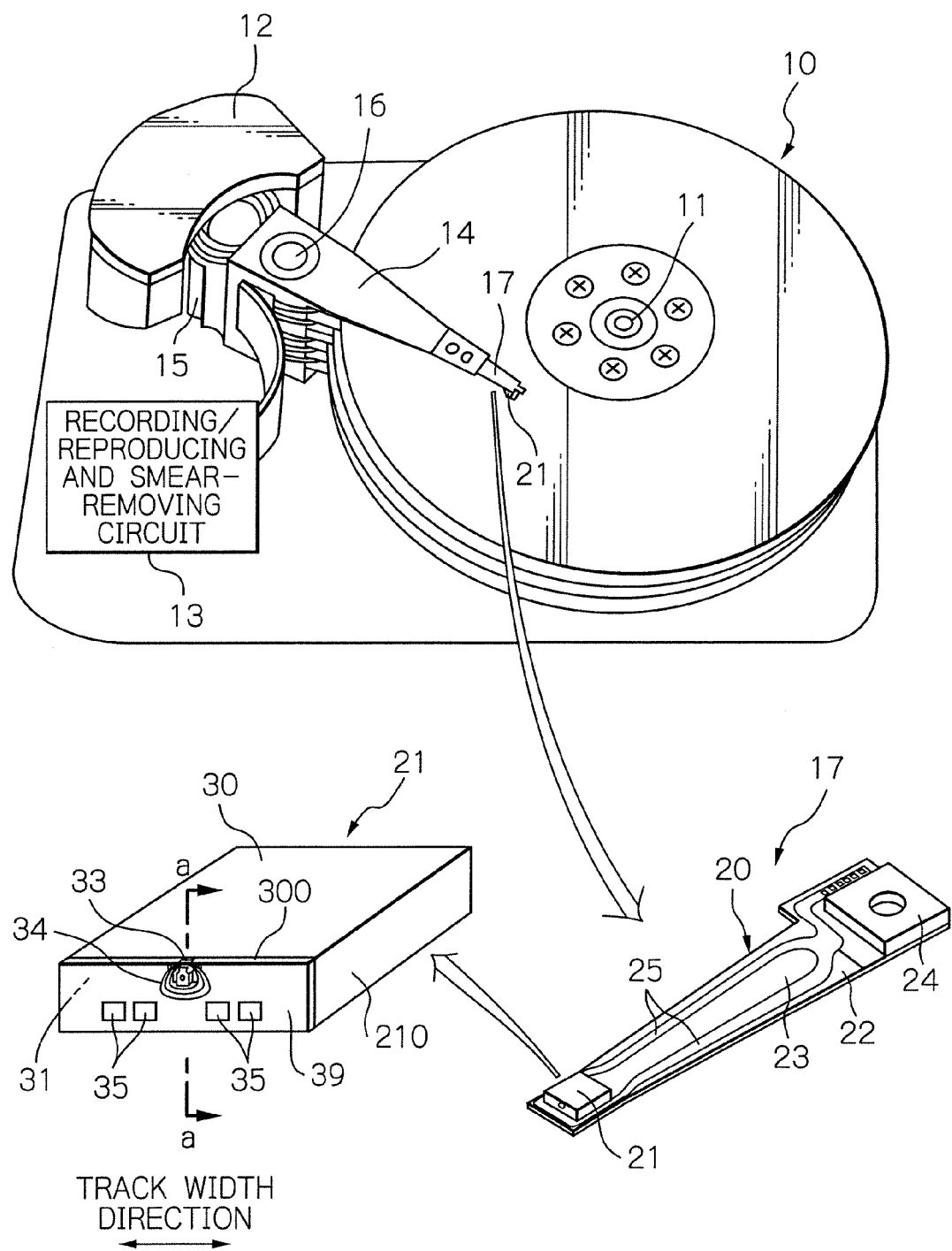
FIG. 1 shows a perspective view schematically illustrating a configuration of an embodiment of the magnetic recording/reproducing apparatus according to the present invention.

FIG. 1 shows a perspective view schematically illustrating a configuration of an embodiment of the magnetic recording/reproducing apparatus according to the present invention. In magnified views of a head gimbal assembly (HGA) and a thin-film magnetic head of FIG. 1, the side opposed to a magnetic disk is turned upward.

The magnetic recording/reproducing apparatus shown in FIG. 1 is a magnetic disk drive apparatus, and includes a plurality of magnetic disks 10 as magnetic recording media which rotate around a spindle of a spindle motor 11, an assembly carriage device 12 provided with a plurality of drive arms 14, an HGA 17 mounted to the end portion of each of the drive arms 14 and provided with a thin-film magnetic head (slider) 21, and a recording/reproducing and smear-removing control circuit 13 for controlling write and read operations and controlling a smear removing operation which will be described later in detail. The configuration of the recording/reproducing and smear-removing control circuit 13 will also be described in detail later.

The assembly carriage device 12 is a device for positioning the thin-film magnetic head 21 above a track formed on the magnetic disk 10. In the device, the drive arms 14 are stacked in the direction along the pivot bearing axis 16, and are capable of angular-pivoting about the axis 16 by a voice coil motor (VCM) 15. The magnetic disks 10, the drive arms 14, the HGAs 17 and the sliders 21 may be adopted singularly.

According to FIG. 1, in the HGA 17, the thin-film magnetic head 21 is fixedly attached to the end portion of a suspension 20 so as to be opposed to the surface of each of the magnetic disks 10 at a predetermined space (flying height). Further, one end of a wiring member 25 is electrically connected to terminal electrodes of the thin-film magnetic head 21.

The suspension 20 includes a load beam 22, a flexure 23 with elasticity fixedly attached to the load beam 22, a base plate 24 provided at the base portion of the load beam 22, and a wiring member 25 constituted of lead conductors provided on the flexure 23 and connecting pads electrically connected to both ends of the lead conductor. Though not illustrated, a head drive IC chip may be fitted to some midpoint in the suspension 20.

According to FIG. 1, the thin-film magnetic head 21 includes a slider substrate 210 having an element formation surface 31 and an air bearing surface (ABS) 30 which is processed to obtain a appropriate flying height, an MR effect element 33 for reading data and an electromagnetic coil element 34 for writing data which are formed on/above the element formation surface 31, an overcoat layer 39 formed to cover the MR effect element 33 and the electromagnetic coil element 34, and four signal electrodes 35 exposed from an upper layer surface of the overcoat layer 39. In this case, the ABS 30 becomes the surface opposed to the magnetic disk 10. Respective two of the four signal electrodes 35 are connected to the MR effect element 33 and the electromagnetic coil element 34.

One ends of the MR effect element 33 and the electromagnetic coil element 34 reach a head end surface 300 on the ABS 30 side. These ends are opposed to the surface of the magnetic disk 10, and therewith, reading is performed by sensing a signal field and writing is performed by applying a signal field. An extremely thin protective film constituted of a diamond-like carbon (DLC) or the like may be coated on a predetermined region of the head end surface 300 which these ends reach.

Here, due to vibrations, external impacts or the like during the operation, one end of the MR effect element 33 and the surface of the magnetic disk 10 are likely to contact or crash with each other. If such contact or crash occurs, a scratch is formed on the ABS 30 or the head end surface 300 by breaking through the protective film. Further, in some cases, a part of the electrode layer end of the MR effect element 33 or a part of the end of the MR effect multilayer is trailed, and the inside of the MR effect multilayer or the MR effect multilayer and the electrode layer may be electrically short-circuited. The scar that causes the short-circuit becomes smear. The smear has a possibility to cause substantial decrease in a sense current and to bring about an error of reduction in read output. The present invention provides a method for removing such smear.

Figure 2:
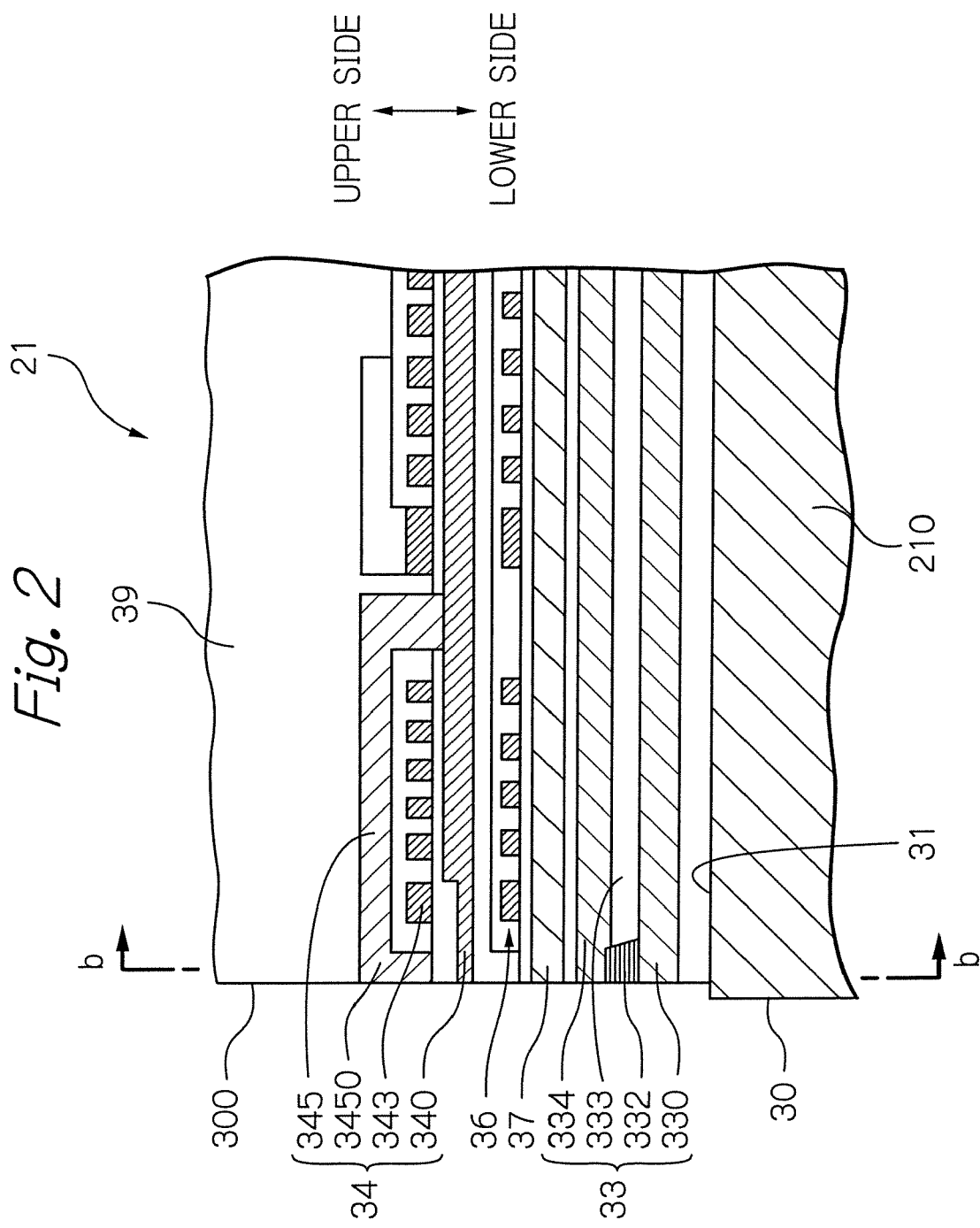
FIG. 2 shows a cross-sectional view taken along the line a-a in FIG. 1, schematically illustrating the configuration of a main portion of the thin-film magnetic head.

FIG. 2 shows a cross-sectional view taken along the line a-a in FIG. 1, schematically illustrating the configuration of a main portion of the thin-film magnetic head 21. In FIG. 2, the electromagnetic coil element 34 is for perpendicular magnetic recording, however may be an electromagnetic coil element for longitudinal magnetic recording including a write coil layer and upper and lower magnetic pole layers pinching a write gap layer at the end portion on the head end surface side.

In FIG. 2, the MR effect element 33 is a TMR effect element or a CPP-GMR effect element, and includes an MR effect multilayer 332, an insulating layer 333 formed to cover at least the rear side of the multilayer, and a lower electrode layer 330 and an upper electrode layer 334 which are two electrode layers disposed at the positions to sandwich the MR effect multilayer 332 and the insulating layer 333. The MR effect multilayer 332 senses a signal field from the magnetic disk with very high sensitivity. The upper and lower electrode layers 334 and 330 are electrodes for applying a sense current in the direction perpendicular to the stacked surfaces to the MR effect multilayer 332, and also act as magnetic shields which prevent the multilayer 332 from receiving an external magnetic field which becomes noise.

The electromagnetic coil element 34 is for perpendicular magnetic recording in this embodiment, and includes a main magnetic pole layer 340 formed of a soft magnetic material such as NiFe (permalloy), CoFeNi, CoFe, FeN or FeZrN, a write coil layer 343 formed of a conductive material such as Cu (copper), and an auxiliary magnetic pole layer 345 formed of a soft magnetic material such as NiFe (permalloy), CoFeNi, CoFe, FeN or FeZrN. The main magnetic pole layer 340 is a magnetically guiding path for guiding and converging a magnetic flux generated by applying a write current to the write coil layer 343 toward a magnetic record layer of the magnetic disk 10 to be written. In this case, the length in the layer thickness direction (thickness) in the end portion on the head end surface 300 side of the main magnetic pole layer 340 becomes smaller as compared with the other portions. As a result, a microscopic write magnetic field corresponding to high recording density can be generated. The write coil layer 343 has a monolayer structure in this embodiment, however may have two-or-more-layered structure or a helical shape. The number of turns is not limited to that of FIG. 2.

The end portion of the auxiliary magnetic pole layer 345 on the head end surface 300 side becomes a trailing shield portion 3450 which has a wider layer cross-section than the other portions. By providing the trailing shield portion 3450, a magnetic field gradient becomes steeper between the end portion of the trailing shield portion 3450 and the end portion of the main magnetic pole layer 340. As a result, jitter of signal output becomes smaller and an error rate during reading can be reduced.

Further, in this embodiment, a backing coil portion 36 and an inter-element shield layer 37 are provided between the MR effect element 33 and the electromagnetic coil element 34. The backing coil portion 36 suppresses a wide area adjacent-track erase (WATE) behavior, which is an unwanted write or erase operation to the magnetic disk, by generating a magnetic flux for negating the magnetic flux loop that arises from the electromagnetic coil element 34 through the upper and lower electrode layers 334 and 330 of the MR effect element 33.

Figure 3:
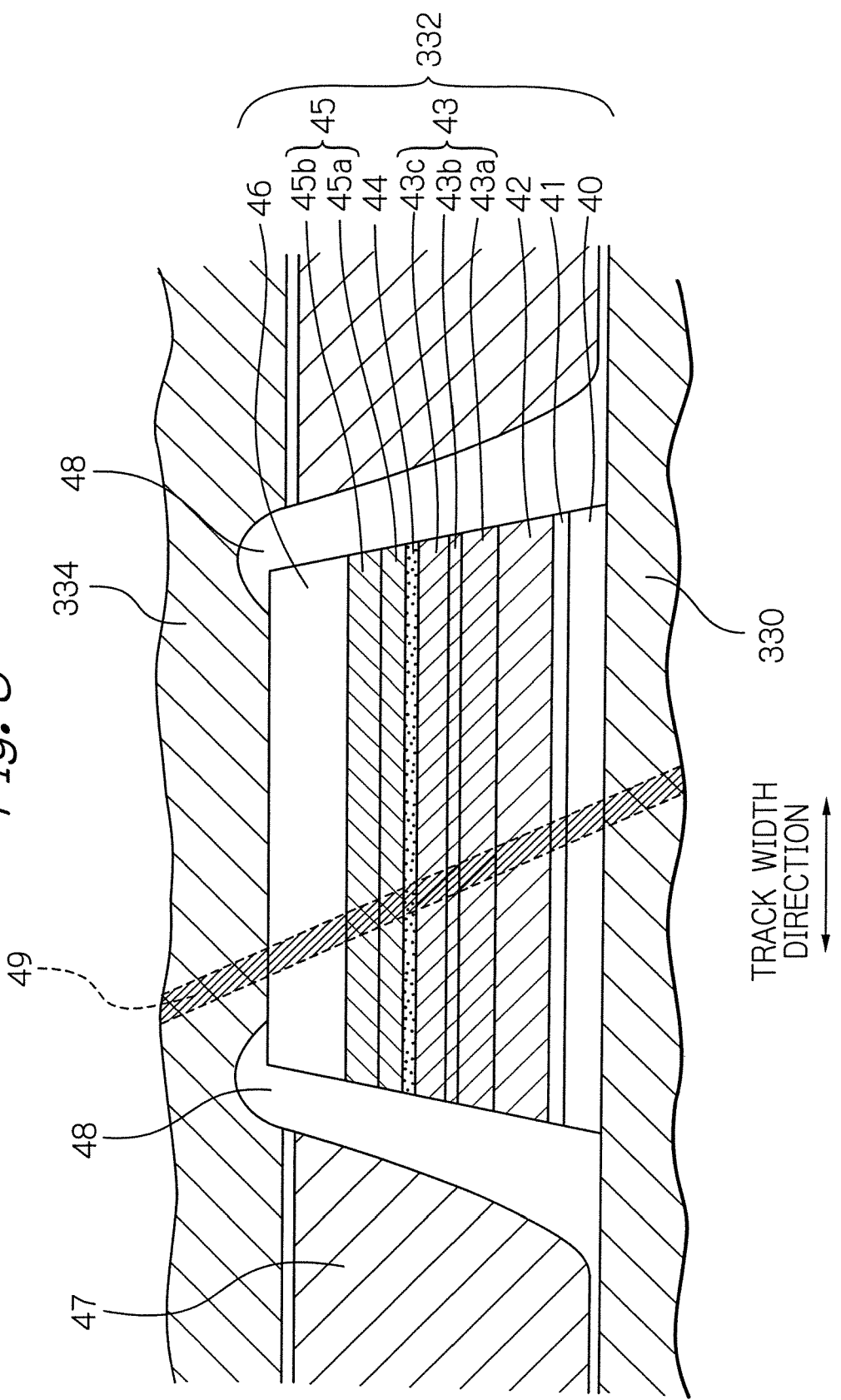
FIG. 3 shows a cross-sectional view taken along the line b-b viewed from the head end surface side of FIG. 2, schematically illustrating the layer structure in an embodiment of the MR effect multilayer.

FIG. 3 shows a cross-sectional view taken along the line b-b viewed from the head end surface 300 side of FIG. 2, schematically illustrating the layer structure in an embodiment of the MR effect multilayer 332.

In FIG. 3, the MR effect multilayer 332 is a TMR effect multilayer, and has a multilayered structure in which a lower metal layer 40, a base layer 41, an antiferromagnetic layer 42 formed of an antiferromagnetic material, a pinned layer 43 formed of a ferromagnetic material, a tunnel barrier layer 44 as a nonmagnetic intermediate layer formed of an oxide layer, a free layer 45 formed of a ferromagnetic material and an upper metal layer 46 are sequentially stacked.

The lower metal layer 40 is formed on the lower electrode layer 330, and electrically connects the MR effect multilayer 332 to the lower electrode layer 330. In this case, the lower metal layer 40 is formed of Ta, Hf, Nb, Zr, Ti, Mo, W or the like with a thickness of about 0.5 to 7 nm (nanometers), for example, and the lower electrode layer 330 is formed of a soft magnetic conductive material such as NiFe, CoFeNi, CoFe, FeN or FeZrN with a thickness of about 0.3 to 5 μm (micrometers), for example. Further, the upper metal layer 46 electrically connects the MR effect multilayer 332 to the upper electrode layer 334 by the upper electrode layer 334 being formed on the upper metal layer 46. Accordingly, a sense current during detecting a magnetic field flows in the direction perpendicular to each layer surface in the MR effect multilayer 332. In this case, the upper metal layer 46 is formed of Ta, Ru, Hf, Nb, Zr, Ti, Cr, Mo, W or the like with a thickness of about 1 to 20 nm, for example, and the upper electrode layer 334 is formed of a soft magnetic conductive material such as NiFe, CoFeNi, CoFe, FeN, FeZrN or the like with a thickness of about 0.5 to 5 μm, for example.

The antiferromagnetic layer 42 is provided on the lower metal layer 40 via the base layer 41. In this case, the base layer 41 is formed of NiCr, NiFe or the like with a thickness of about 3 to 8 nm, for example, and the antiferromagnetic layer 42 is formed of IrMn, PtMn, NiMn, RuRhMn or the like with a thickness of about 3 to 18 nm, for example. The pinned layer 43 stacked on the antiferromagnetic layer 42 has a so-called synthetic-ferri-pinned structure in which a first ferromagnetic film 43a, a nonmagnetic film 43b and a second ferromagnetic film 43c are deposited and stacked in sequence from the antiferromagnetic layer 42 side. An exchange bias magnetic filed is applied to the first ferromagnetic film 43a due to exchange coupling with the antiferromagnetic layer 42. Thereby, the entire magnetization of the pinned layer 43 is stably fixed. In this case, the first ferromagnetic film 43a is formed of CoFe or the like with a thickness of about 1 to 4 nm, for example. The nonmagnetic film 43b is formed of Ru, Rh, Ir, Cr, Re, Cu or the like with a thickness of about 0.5 to 2 nm, for example. Further, the second ferromagnetic film 43c is formed of CoFe or the like with a thickness of about 1 to 5 nm, for example.

The tunnel barrier layer 44 is provided on the pinned layer 43, and the free layer 45 is further provided so as to sandwich the tunnel barrier layer 44 between the free layer 45 and the pinned layer 43. The free layer 45 has the structure in which a high polarizability film 45a and a soft magnetic film 45b are deposited and stacked in sequence from the tunnel barrier layer 44 side. In this case, the magnetization of the free layer 45 forms ferromagnetic tunnel coupling with the magnetization of the pinned layer 43 using the tunnel barrier layer 44 as a barrier of the tunnel effect. Accordingly, when the magnetization direction of the free layer 45 changes in response to the signal magnetic field, a tunnel current increases/decreases due to the variation of the state densities of up and down spin bands of conductive electrons in the pinned layer 43 and the free layer 45. As a result, the electric resistance value of the MR effect multilayer 332 changes. By measuring the change amount, a very weak and local signal magnetic field can be reliably detected with high sensitivity.

The tunnel barrier layer may be formed of an oxide film obtained by applying oxidation treatment to a base film formed of a metal such as Al, Mg, Ti, Hf, Zn, Ta, Zr, Mo, W, Sn, Ni, Gd, Nb, Ga, Ge or the like or of such as Si with a film thickness of about 0.6 to 2 nm. Or the tunnel barrier layer may be formed of, for example, $Al_2O_3$ (alumina) or MgO (magnesia). The high polarizability film 45a is formed of CoFe or the like with a thickness of about 0.5 to 2 nm, for example, and the soft magnetic film 45b is formed of NiFe or the like with a thickness of about 1 to 8 nm.

The mode of each layer constituting the MR effect multilayer 332 is not limited to the one described above. For example, the pinned layer 43 may be of a single layer structure formed of a ferromagnetic film or a multilayered structure with the number of layers other than this embodiment. Further, the free layer 45 may be of a single layer structure in which a high polarizability film is not present, or a multilayered structure with three or more layers including the film for adjusting magnetostriction. Further, the antiferromagnetic layer, the pinned layer, the tunnel barrier layer and the free layer may be stacked in the inverse sequence, that is, in the sequence of the free layer, the tunnel barrier layer, the pinned layer and the antiferromagnetic layer. The MR effect multilayer 332 may be a CPP-GMR effect multilayer having a nonmagnetic intermediate layer formed of a nonmagnetic metal, instead of the tunnel barrier layer.

As shown in FIG. 3, hard bias layers 47 formed of a hard magnetic material may be provided on both sides in the track width direction of at least the free layer 45 via the insulating layers 48. Though not illustrated, an in-stack bias multilayer in which a bias nonmagnetic layer, a bias ferromagnetic layer and a bias antiferromagnetic layer are stacked in sequence may be provided between the free layer 45 and the upper metal layer 46. The bias means stabilizes a magnetic domain structure of the free layer 45 by applying a bias magnetic field to the free layer 45, and enables element output with a stable line shape.

In FIG. 3, shown is an example of smear that causes the problem. Smear 49 is present on the end surface of at least the MR effect element 33 on the head end surface 300. Accordingly, it should be noticed that the smear 49 is not on the cross-section of FIG. 3, as shown by broken lines.

The smear 49 is formed by such a way that a portion of the end surface of the lower electrode layer 330, the upper electrode layer 334 or the MR effect multilayer 332 is trailed, and is present on the end surface of at least the MR effect element 33. Due to the presence of the smear 49, the pinned layer 43 and the free layer 45, the lower electrode layer 330 and the free layer 45, or the pinned layer 43 and the upper electrode layer 334 are electrically short-circuited. As a result, a sense current is substantially decreased, and an error of reduction in read output may occur. The present invention applies a stress voltage between the upper and lower electrode layers 334 and 330 and removes, for example, the smear 49 by burning it off, as described later in detail.

Figure 4:
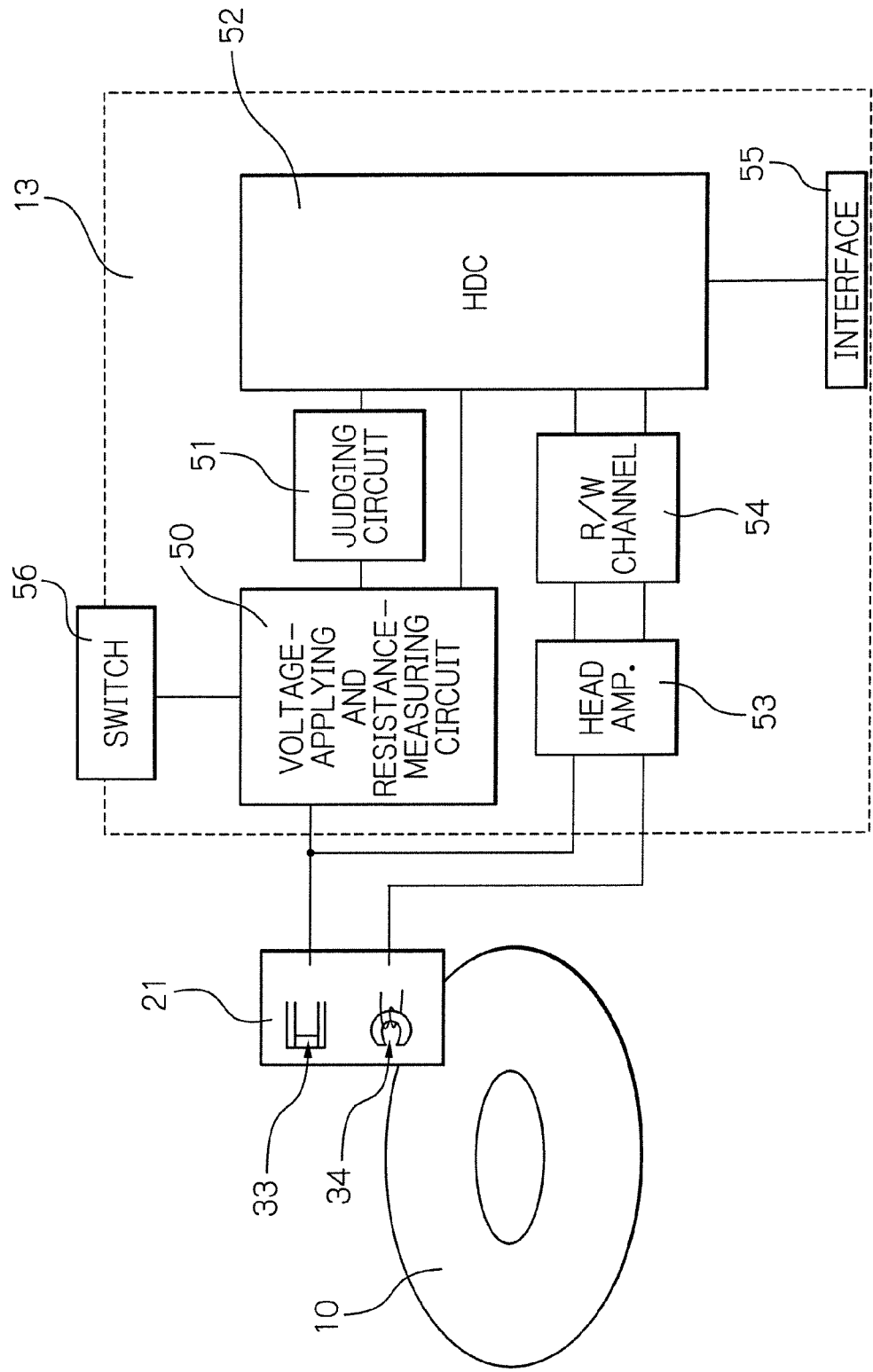
FIG. 4 shows a block diagram schematically illustrating an embodiment of a recording/reproducing and smear-removing control circuit provided within the magnetic recording/reproducing apparatus according to the present invention.

FIG. 4 shows a block diagram schematically illustrating an embodiment of a recording/reproducing and smear-removing control circuit 13 (FIG. 1) provided within the magnetic recording/reproducing apparatus according to the present invention. According to FIG. 4, the recording/reproducing and smear-removing control circuit 13 includes a voltage-applying and resistance-measuring circuit 50, a judging circuit 51, a hard disk controller (HDC) 52, a head amplifier 53, a read/write (R/W) channel 54, and an interface 55. Further, a voltage-application switch 56 may be provided.

The head amplifier 53 includes a writer amplifier and a reader amplifier though not illustrated. The writer amplifier is write amplifying means for amplifying a write input signal from the R/W channel 54 and forming a write current, and applying the write current to a write coil layer of the electromagnetic coil element 34. Further, the reader amplifier is read amplifying means for amplifying a read voltage outputted from the MR effect multilayer of the MR effect element 33 and forming a read output signal and outputting the read output signal to the R/W channel 54. The R/W channel 54 code-modulates a data signal which it receives from the HDC 52, forms a write input signal and outputs the signal to the head amplifier 53, while it code-demodulates a read output signal outputted from the head amplifier 53, forms a data signal and outputs the signal to the HDC 52.

The voltage-applying and resistance-measuring circuit 50 is connected to the MR effect element 33, the judging circuit 51 and the HDC 52. The circuit 50 is for applying a stress voltage for removing smear between the upper and lower electrode layers of the MR effect element 33, and for measuring the electric resistance or the output voltage of the MR effect element 33. Voltage application and measurement of electric resistance or output voltage by this circuit 50 may be performed by the instruction of the HDC 52, or may be performed by the instruction of the voltage-application switch 56 which is connected to the circuit 50 and provided for instructing the voltage-applying operation or the resistance-measuring operation from the outside. The judging circuit 51 is connected to the voltage-applying and resistance-measuring circuit 50 and the HDC 52. The circuit 51 is for judging and determining necessity of the application of a stress voltage, and a start time or finish time of the application of the stress voltage based on the measurement result of the electric resistance or the output voltage in the voltage-applying and resistance-measuring circuit 50.

The HDC 52 is a controller which receives the judgment result in the judging circuit 51, outputs the information of the electric resistance or the output voltage value of the MR effect element 33, the error information by smear or information of smear removing to an outside through the interface 55, and further controls the voltage-applying operation and the resistance-measuring operation of the voltage-applying and resistance-measuring circuit 50. The HDC 52 includes the function of adding an error correction code to a data signal received from an external host system through the interface 55 and then outputting the data signal to the R/W channel 54, while applying error correction processing to the data signal receiving from the R/W channel 54, and then transmitting the data signal to the external host system through the interface 55. The HDC 52 may further include the function of controlling a buffer of data signals and controlling the interface 55.

The magnetic recording/reproducing apparatus includes the just described recording/reproducing and smear-removing control circuit 13 having the voltage-applying and resistance-measuring circuit 50, the judging circuit 51 and the HDC 52, whereby the stress voltage is suitably applied between the upper and lower electrode layers of the MR effect element 33 in various modes which will be described later, and smear can be removed.

When the magnetic recording/reproducing apparatus is provided with a plurality of thin-film magnetic heads, preferably provided are the voltage-applying and resistance-measuring circuit and the judging circuit corresponding to the configuration and the number of the heads to be connected.

FIGS. 5a to 5f show graphs representing the examples of measuring the electric resistance and the output voltage of the MR effect element when a stress voltage is actually applied to the element. Here, FIGS. 5a to 5c show the measurement results of the case where smear occurs, and FIGS. 5d to 5f show the measurement results of the case where smear does not occur. In each of the figures, the horizontal axis represents a stress voltage applied by being monotonously increased. The vertical axis represents the electric resistance and the output voltage of the MR effect element that changes with increase of the stress voltage, which is normalized with the value at the early stage of voltage application set to be 100.

In this case, the electric resistance of the MR effect element was obtained by measuring the electric resistance between the two signal electrodes 35 (FIG. 1) connected to the MR effect element. The change in the measured value of the electric resistance mainly corresponds to the change in the electric resistance between the upper and lower electrode layers of the MR effect element. And the change in the output voltage of the MR effect element mainly corresponds to change in voltage between the upper and lower electrode layers when a constant sense current flows between the upper and lower electrode layers. Further, each of the MR effect elements of the heads used for measurement was a TMR effect element with $Al_2O_3$ used as the tunnel barrier layer, and the sheet resistance RA that was the product of the electric resistance value of the original element in which smear did not occur and the area of the layer surface on which the sense current flowed effectively was 2.7 $\Omega\mu m^2$. As the stress voltage, a pulse voltage with a pulse width of one second was used.

According to FIGS. 5a to 5c, in the case of the thin-film magnetic head where smear occurs, the electric resistance value at the early stage of voltage application in the MR effect element (corresponds to 100 of the vertical axis, numeral values are clearly shown on the left upper side of each figure) is 214.2 $\Omega$ on average, and is smaller than the average value of 274.4 $\Omega$ in the case where smear does not occur of FIGS. 5d to 5f, beyond the range of the variation among the samples. Specifically, it is found out that the presence of smear causes a short-circuit in the element and reduces the electric resistance of the element. When the stress voltage is increased in these heads, the electric resistance value and the output voltage value abruptly increase from the point of a certain stress voltage. In this case, the abrupt increase is due to the fact that the smear that was the cause of a short-circuit was burned off by the stress voltage, and the original resistance value of the MR effect element was recovered.

In FIGS. 5a to 5c, the electric resistance and the output voltage show the minimum values in the range of the stress voltage of about 300 to 350 mV (millivolts) before abrupt rise. It is conceivable that the cause of showing such minimum values is that when a stress voltage with a certain degree is applied at first, the contact resistance between the smear and the electrode layer or the MR effect multilayer rather decreases in some cases. It should be noted that the behavior of showing such minimum values in the electric resistance value and the output voltage value does not always appear clearly.

It is understood that by applying the stress voltage as described above, smear can be removed in each head, and by monitoring the electric resistance or the output voltage as described above, occurrence of smear and removal of it can be checked.

Also in FIGS. 5a to 5c, when the stress voltage is further increased, the electric resistance value and the output voltage value both abruptly drop when the stress voltage exceeds 500 to 550 mV. The abrupt drop indicates that the MR effect element is broken, and the stress voltage value as the threshold value on this occasion becomes an element breaking voltage. The stress voltage applied for removing smear naturally has the value less than the element breaking voltage as the upper limit, and does not break the electric insulation properties of the tunnel barrier layer.

On the other hand, according to FIGS. 5d to 5f, in case of the thin-film magnetic heads in which smear does not occur, even if the stress voltage is increased, the electric resistance and the output voltage do not show large change until the stress voltage reaches the element breaking voltage. Accordingly, by studying the relationship between the applied stress voltage and the electric resistance of the MR effect element or between the applied stress voltage and the output voltage of the MR effect element, the information of the presence of smear (error due to smear) or smear removal can obtained. The smaller electric resistance value at the initial stage of voltage application, the behavior showing the minimum value of the electric resistance or the output voltage, the increase in electric resistance or output voltage before the stress voltage reaches the element breaking voltage can be especially used for judging the presence of smear.

Figure 6E:
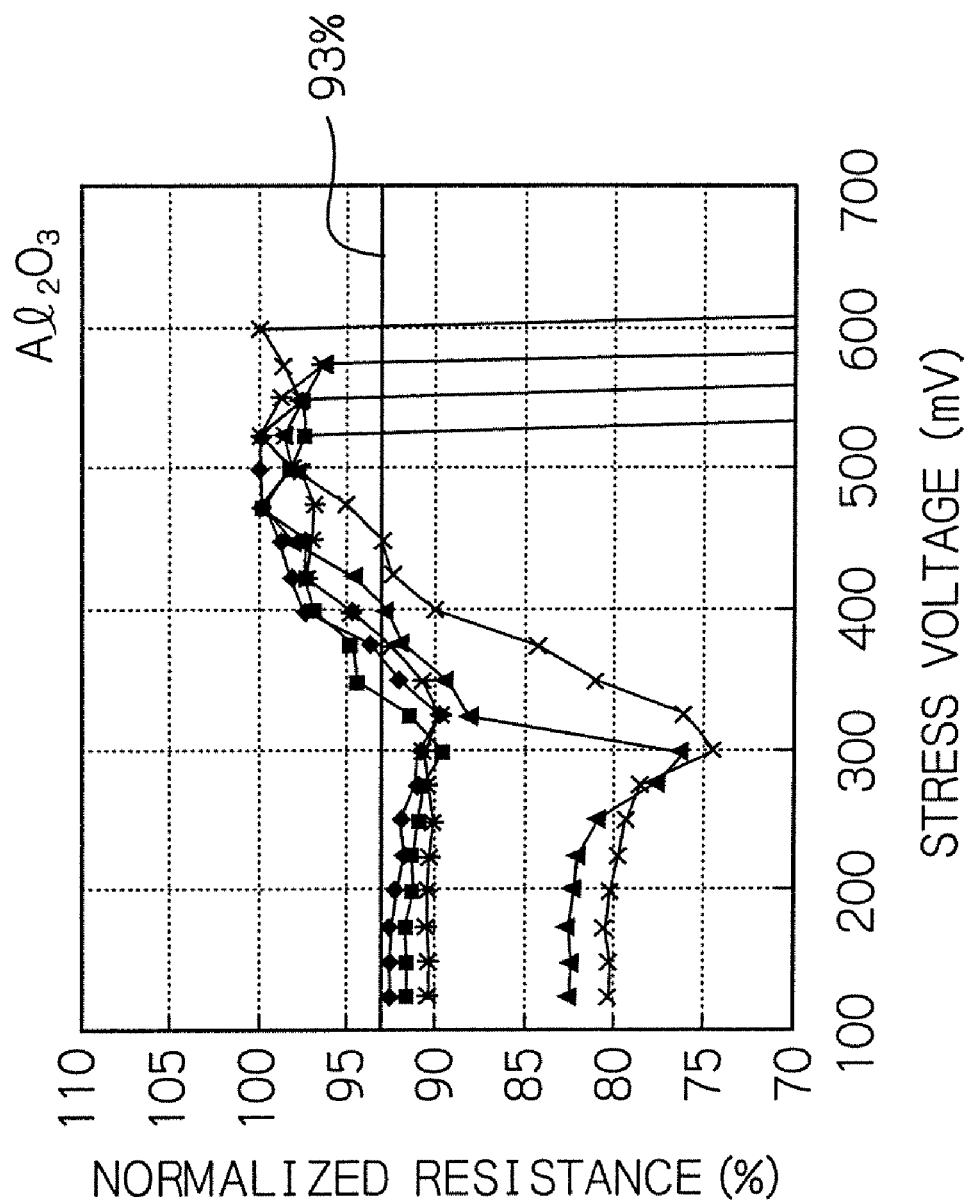
FIG. 6e shows a graph representing the relationship between the stress voltage and the electric resistance in the TMR effect elements of various specifications in which the electric resistance is reduced due to presence of smear.

FIGS. 6a and 6b show graphs representing the results of measuring the element breaking voltage in the TMR effect elements of various specifications. FIGS. 6c and 6d show graphs representing the average relationship between the stress voltage and the electric resistance in the elements in which smear exists. Further, FIG. 6e shows a graph representing the relationship between the stress voltage and the electric resistance in the TMR effect elements of various specifications in which the electric resistance is reduced due to presence of smear.

Here, FIGS. 6a, 6c and 6e show the measurement results in the elements in which tunnel barrier layers are formed of $Al_2O_3$, and FIGS. 6b and 6d show the measurement results in the elements in which tunnel barrier layers are formed of MgO. In each figure, the horizontal axis represents the applied voltage or stress voltage, and the vertical axis represents the electric resistance of the element. However, the vertical axis in FIGS. 6c to 6e represent normalized electric resistances when the maximum value of the electric resistance in each of the samples is set to be 100. The voltage was applied by setting one step at 25 mV and increasing the voltage value stepwise. The number of samples shown in FIGS. 6a and 6b and the number of samples for obtaining the average graphs in FIGS. 6c and 6d are each 100.

According to FIG. 6a, the maximum allowable applied voltage to the TMR effect element of which the tunnel barrier layer was $Al_2O_3$ was 560.2 mV in average. The 3σ (three sigma) denoting a variation was 44.9 mV, and was about 8% of the average value. Incidentally, the element breaking voltage has the value that is the result of adding one step amount of voltage application to the maximum allowable applied voltage. When the value that is smaller by the variation 3σ than the average value of the maximum allowable applied voltage is set as the upper limit value of the stress voltage for removing smear, from the common sense in statistics, the upper limit value becomes 515 mV. Accordingly, the stress voltage for removing smear in the TMR effect element of which the tunnel barrier layer is $Al_2O_3$ is preferably 515 mV or less.

On the other hand, according to FIG. 6b, the maximum allowable applied voltage to the TMR effect element of which the tunnel barrier layer was MgO was 585.9 mV in average, and the 3σ denoting a variation was 60.5 mV, and was about 10% of the average value. When the value that is smaller by the variation 3σ than the average value of the maximum allowable applied voltage is set as the upper limit value of the stress voltage for removing smear, as in the case of FIG. 6a, the upper limit value becomes 527 mV. Accordingly, the stress voltage for removing smear in the TMR effect element of which the tunnel barrier layer is MgO is preferably 527 mV or less.

Table 1 provides a summary of the average value of the maximum allowable applied voltage, the variation 3σ and the preferable upper limit value of the stress voltage in each case that the tunnel barrier layer is $Al_2O_3$, and is MgO.

TABLE 1

| | Tunnel barrier layer | |
|---|---|---|
| | $Al_2O_3$ | MgO |
| Maximum allowable applied voltage (mV) | 560.2 | 585.9 |
| Variation 3σ (mV) | 44.9 (8%) | 60.5 (10%) |
| upper limit value of stress voltage (mV) | 515 | 527 |

Next, from the upper limit values of the stress voltage, the upper specified values of electric resistance will be obtained.

As described above, FIG. 6c shows the behavior of the average electric resistance of the TMR effect element in which tunnel barrier layer is $Al_2O_3$. In this behavior, the normalized electric resistance at the stress voltage of 515 mV that is the above described upper limit value is 97.8%. Here, it has been confirmed that, in the behavior of the average electric resistance, the electric resistance value on the occasion of applying the maximum allowable applied voltage substantially corresponds to the electric resistance value in the normal case where smear is not present. Accordingly, it is found out that a sufficient stress voltage is applied and smear is properly removed when application of the stress voltage is finished by concluding that the stress voltage reaches the upper limit at the point where the electric resistance value of the element reaches 97.8% of the electric resistance value in the normal case where smear is not present.

From the above result, it is understood that, in the TMR effect element of which the tunnel barrier layer is $Al_2O_3$, it is preferable to set 97.8% of the electric resistance value in the normal case where smear is not present as the upper limit specified value, and increase the stress voltage until the electric resistance increases to reach the upper specified value. The value exceeding 97.8% could be set as the upper limit specified value, and the value is selected depending on to what degree the risk of breakage of the TMR effect element is allowed.

On the other hand, FIG. 6d shows the behavior of the average electric resistance of the TMR effect element in which the tunnel barrier layer is MgO. In the behavior, the normalized electric resistance at the stress voltage of 515 mV which is the above described upper limit value is 97.3%. Accordingly, it is understood that in the TMR effect element in which the tunnel barrier layer is MgO, it is preferable to set 97.3% of the electric resistance value in the normal case where smear is not present as the upper limit specified value, and increase the stress voltage until the electric resistance increases to reach the upper limit specified value. As in the case of the tunnel barrier layer being $Al_2O_3$, the value exceeding 97.8% could be set as the upper limit specified value, and the value is selected depending on to what degree the risk of breakage of the TMR effect element is allowed.

Next, the determination of presence or absence of smear by the electric resistance value of the TMR effect element, that is, the determination of whether smear removing process is to be performed or not, will be described.

According to FIG. 6e, in any of the TMR effect element in which the tunnel barrier layer is $Al_2O_3$, the electric resistance before the voltage is applied reduces due to presence of smear as compared with the normal case where smear is not present. The reduced electric resistance value is less than 93 in any case when the maximum value of the electric resistance is set to be 100, and the reduction exceeds at least 7%. Further, it has been confirmed that, in any TMR effect element, the maximum value of the electric resistance in the range until the maximum allowable applied voltage is applied substantially corresponds to the electric resistance value in the normal case where smear is not present. Accordingly, it can be determined that smear is present when the electric resistance before the voltage is applied is less than 93% of the normal value in the case without smear, and thereby, the smear can be reliably removed from the element where the smear is present.

From the above result, it is understood that, under the condition that the 93% of the electric resistance value in the normal case without smear is set as the lower limit specified value, the stress voltage for removing smear is preferably applied when the measured electric resistance value is smaller than the lower limit specified value.

Further, it has been confirmed that, in the case of the TMR effect element in which the tunnel barrier layer is MgO, the electric resistance before the voltage is applied reduces at least more than 7% due to presence of smear as compared with the normal case where smear is not present. Accordingly, it is understood that, also in the element of which tunnel barrier layer is MgO, under the condition of setting the 93% of the electric resistance value in the normal case where smear is not present as the lower limit specified value, the stress voltage for removing smear is preferably applied when the measured electric resistance value is smaller than the lower limit specified value.

The lower limit value of the stress voltage to be applied is preferably set to be 300 mV since rise in the electric resistance value (output voltage value) is seen at about 300 to 350 mV in FIGS. 5a to 5c and FIGS. 6a to 6e. For more safety, the lower limit value may also be preferably set at 100 mV.

FIGS. 7a to 7d show flowcharts illustrating various embodiments in the method for removing smear according to the present invention.

According to FIG. 7a, the magnetic recording/reproducing apparatus is started, the electric resistance of the MR effect element is measured first, and then, it is judged whether the electric resistance value is less than a predetermined lower limit specified value or not (step Sa1). As the lower limit specified value, the value of 93% of the electric resistance value in the normal MR effect element of the same configuration and size in which smear is not present, can be used as explained by using FIG. 6e. For example, the magnetic recording/reproducing apparatus stores the initial value of the electric resistance in the MR effect element when the apparatus is provided with a head, and may calculate the lower limit specified value from this value. The measurement and judgment of the electric resistance can be performed by the voltage-applying and resistance-measuring circuit 50 and the judging circuit 51 (FIG. 4). When the electric resistance value of the element is the lower limit specified value or more as the result of the judgment, it is determined that smear does not occur and the drive of the apparatus is continued.

On the other hand, if the electric resistance value of the element is less than the lower limit specified value, it is determined that smear occurs, and a pulse voltage of a predetermined pulse width is applied to the MR effect element as the stress voltage (step Sa2). The application of the stress voltage can be performed by the voltage-applying and resistance-measuring circuit 50 (FIG. 4) under the instruction of HDC (FIG. 4) receiving the judging result of the judging circuit 51 (FIG. 4). Thereafter, the apparatus is restarted (step Sa3), and it is judged whether the electric resistance value of the MR effect element is a predetermined upper limit specified value or more (step Sa4). As the upper limit specified value, the value of 97.8% (in the case of the tunnel barrier layer being $Al_2O_3$) or the value of 97.3% (in the case of the tunnel barrier layer being MgO) of the electric resistance value in the normal MR effect element having the same configuration and size without smear can be used, as explained by using FIGS. 6a and 6b. For example, as in the case of the above-described lower limit specified value, the magnetic recording/reproducing apparatus stores the initial value of the electric resistance in the MR effect element when the apparatus is provided with the head, and may calculate the upper limit specified value from this value.

As a result of judgment in step Sa4, if the electric resistance value of this element is the upper limit specified value or more, it is determined that smear is removed and drive of the apparatus is continued. On the other hand, if the electric resistance value of the element is less than the upper limit specified value, it is determined that smear is still present, and the steps after the step Sa2 are repeated until it is determined that the smear is removed.

According to FIG. 7b, the magnetic recording/reproducing apparatus is started, the electric resistance of the MR effect element is measured, and then, it is determined whether the electric resistance value is less than the predetermined specified value or not (step Sb1). The lower limit specified value can be set as in the step Sa1. Measurement and judgment of the electric resistance can be also performed by the voltage-applying and resistance-measuring circuit 50 and the judging circuit 51 (FIG. 4) respectively. As a result of the judgment, if the electric resistance value of the element is the lower limit specified value or more, it is determined that smear does not occur, and drive of the apparatus is continued.

On the other hand, if the electric resistance value of the element is less than the lower limit specified value, it is determined that smear occurs, and a continuous voltage which increases in value with time is applied to the MR effect element as the stress voltage (step Sb2). On this occasion, the electric resistance value is continuously monitored. Application of the stress voltage and monitoring of the electric resistance value can be performed by the voltage-applying and resistance-measuring circuit 50 (FIG. 4) under the instruction of HDC (FIG. 4) receiving the judgment result of the judging circuit 51 (FIG. 4). Thereafter, in monitoring of the electric resistance value, it is judged whether the electric resistance value of the MR effect element reaches the predetermined upper limit specified value or not (step Sb3). Here, the upper limit specified value can be set as in the step Sa4.

As a result of the judgment in step Sb3, when the electric resistance value is less than the upper limit specified value, application of the continuous stress voltage that increases in value with time is continued (step Sb2). On the other and, when the electric resistance value reaches the upper limit specified value and becomes the upper limit specified value or more, application of the continuous stress voltage is finished (step Sb4), the apparatus is restarted (step Sb5), and thereafter, drive of the apparatus is continued.

According to FIG. 7c, the magnetic recording/reproducing apparatus is started, the electric resistance of the MR effect element is measured first, and then, it is judged whether the electric resistance value is less than a predetermined lower limit specified value or not (step Sc1). The lower limit specified value can be set as in the step Sa1. Measurement and judgment of the electric resistance can be similarly performed by the voltage-applying and resistance-measuring circuit 50 and the judging circuit 51 (FIG. 4) respectively. As a result of the judgment, if the electric resistance value of the element is the lower limit specified value or more, it is determined that smear does not occur, and drive of the apparatus is continued.

On the other hand, if the electric resistance value of the element is less than the lower limit specified value, it is determined that smear occurs, and then set up is the voltage value of the pulse voltage as the stress voltage to be applied (step Sc2). Next, the pulse voltage as the set stress voltage is applied to the MR effect element (step Sc3). Setting and application of the stress voltage can be performed by the voltage-applying and resistance-measuring circuit 50 (FIG. 4) under the instruction of the HDC (FIG. 4) which receives the judgment result of the judging circuit 51 (FIG. 4). Thereafter, the apparatus is restarted (step Sc4), and it is determined whether the electric resistance value of the MR effect element is the predetermined upper limit specified value or more (step Sc5). Here, the upper limit specified value can be set as in the step Sa4.

As a result of the judgment in step Sc5, if the electric resistance value of the element is the upper limit specified value or more, it is determined that smear is removed and drive of the apparatus is continued. On the other hand, if the electric resistance value of the element is less than the upper limit specified value, it is determined that smear is still present, the voltage value of the pulse voltage as the stress voltage to be applied is increased stepwise (step Sc2), and the above-described steps are repeated hereafter until the smear is removed.

According to the method for removing smear according to the present invention, the thin-film magnetic head where smear occurs is reliably selected. The stress voltage for burning off smear is properly applied in the above-described various modes, and thereby, smear can be reliably removed without a fear of breaking the element. In each of the embodiments in FIGS. 7a to 7c, the output voltage of the element may be used for judgment of the presence or absence of the smear instead of the electric resistance. In all the embodiments in FIGS. 7a to 7c, the restarting steps of the apparatus (steps Sa3, Sb5, Sc4) are preferably provided as the triggers for measuring the electric resistance value and comparing it with the upper limit specified value, but may be omitted. Further, in the above embodiments, the first judgment of whether smear is present or not is performed at the time of starting the magnetic recording/reproducing apparatus, but may be performed at an arbitrary point of time during drive of the apparatus, for example. In this case, judgment and stress voltage application may be instructed by using the voltage-application switch 56 (FIG. 4). Further, it is obvious that the method for removing smear according to the present invention is not limited to the one carried out in the magnetic recording/reproducing apparatus. Specifically, it can be performed directly for a single thin-film magnetic head or an HGA provided with a thin-film magnetic head, for example.

Further, the backup of data can be performed by using the method for removing smear according to the present invention described above. When smear occurs to a thin-film magnetic head and read operation of data cannot be performed normally in a magnetic recording/reproducing apparatus, for example, the smear is removed and the head is restored at least temporarily. By using the restored head, backup of the data on the magnetic recording medium can be performed. In this case, for example, the HDC 52 determines that the smear is removed from the judgment result from the judging circuit 51 in FIG. 4, and makes the MR effect element 33 to read data. Next, after the data for backup is received by the HDC 52 through the head amplifier 53 and the R/W channel 54, the data is stored in the external magnetic disk drive apparatus or memory for backup through the interface 55. Here, the magnetic recording medium or memory as the backup destination may be provided in the magnetic recording/reproducing apparatus. By the above method, the head which becomes incapable of reading due to occurrence of smear can be restored at least temporarily and backup of the data can be performed reliably.

Here, by using FIG. 7d, another embodiment for judging presence or absence of smear will be described. In the embodiment of FIGS. 7a to 7c described above, judgment of the presence or absence of smear at the time of starting the magnetic recording/reproducing apparatus is performed by comparison of the electric resistance value and the predetermined lower limit specified value. On the other hand, according to FIG. 7d, the magnetic recording/reproducing apparatus is started, and while the continuous voltage increasing with time is being applied as the test voltage, the electric resistance value of the MR effect element is monitored first (step Sd1). On this occasion, the voltage is increased until it reaches a voltage specified value, for example, the value in the range of about 300 to 350 mV in FIGS. 5a to 5c, for example. Next, in the measured relationship of the test voltage and the electric resistance value, it is determined whether the minimum value of the electric resistance is detected beyond the variation of measurement or not (step Sd2). The application of the test voltage, the measurement of the electric resistance and the judgment of the minimum value can be performed by the voltage-applying and resistance-measuring circuit 50 and the judging circuit 51 (FIG. 4) respectively. As a result of the determination, if the minimum value is not present, it is determined that smear does not occur, and drive of the apparatus is continued.

On the other hand, if the minimum value is detected, it is determined that smear occurs, hereafter, the flow goes to step Sa2 (FIG. 7a), step Sb2 (FIG. 7b) or step Sc2 (FIG. 7c), and the above-described predetermined steps are repeated until it is judged that the smear is removed.

According to the above-described method, judgment of presence or absence of smear can be performed with less applied voltage for the MR effect element in which the electric resistance value shows the minimum value. Though this method cannot perform judgment for the MR effect element in which the electric resistance value does not show the minimum value, this method can contribute to enhancement in process yield by adopting the method as an inspection step in the manufacturing process, for example.

As shown below, the method for removing smear according to the present invention described above can also be applied in case of smear occurring in the machining step of sliders.

FIGS. 8a to 8c show a flowchart and schematic views showing one mode in which the method for removing smear according to the present invention is applied to a manufacturing method of a thin-film magnetic head.

According to FIG. 8a, first, an MR effect element for reading data is formed on an element formation surface of a substrate wafer for sliders (step Sm1). Next, an electromagnetic coil element for writing data is formed (step Sm2). Thereafter, an overcoat layer for protecting these elements and signal electrodes electrically connected to these elements are formed (step Sm3). According to the above, a wafer thin-film process is finished. Here, according to FIG. 8b, element patterns 61 including MR effect elements, electromagnetic coil elements and signal electrodes are arranged in a matrix shape on the substrate wafer 60 which has finished the wafer thin-film process.

Next, returning to FIG. 8a, the wafer substrate which finishes the wafer thin-film process is bonded to a cutting and separating jig by using a resin or the like and is cut into row bars in each of which a plurality of head elements are arranged in a row (step Sm4). Thereafter, the row bar is bonded to a polishing jig by using a resin or the like, and polish as MR height process for determining the position of the ABS and MR height of the MR effect multilayer (length in the direction perpendicular to the ABS of the MR effect multilayer) is applied to the row bar (step Sm5).

In the case that the method for removing smear according to the present invention is applied, the removing method is preferably carried out after the polish (step Sm5). Thereby, it is possible to determine whether or not smear occurs during polishing, and smear can be removed before formation of the protective film. In this case, after the polish (step Sm5), measurement of an electric resistance value is performed for each of the MR effect elements of the row bar for which the MR height process was performed, and presence or absence of smear is judged. Here, as shown in FIG. 8c, judgment is performed by bringing a probe 63 connected to the voltage-applying and resistance-measuring circuit into the signal electrode of each of the MR effect elements formed on the row bar 62. This determination can be carried out by comparing the electric resistance value and the above-described lower limit specified value, or checking whether or not the behavior indicating the minimum value of the electric resistance is present, as described in FIGS. 7a to 7d. Returning to FIG. 8a, when it is determined that smear occurs, the smear is removed by applying a stress voltage between the upper and lower electrode layers of the MR effect element through the signal electrodes for the MR effect element until the electric resistance value reaches the above-described upper limit specified value, and burning off the smear (step Sm6).

Next, after the smear is removed, the surface to which polish (step Sm5) is applied is preferably cleaned to remove the residue of the smear that was burned off (step Sm7). As the cleaning, for example, ultrasonic cleaning in pure water can be used. Thereafter, a protective film formed of, for example, DLC or the like for protecting the MR effect elements and the electromagnetic coil element ends is formed on the surface to which polish was applied (step Sm8). Next, the row bar on which the protective film is formed is bonded to a rail forming jig by using a resin or the like, and the process for forming rails on the ABS is performed by using a photolithography method, an ion beam etching method and the like (step Sm9). Thereafter, the row bar on which the rails were formed is bonded to the cutting jig by using a resin or the like, grooving is performed to the row bar, the row bar is cut to be separated into individual sliders (thin-film magnetic heads) (step Sm10). Thereby, the machining process for forming a slider is finished, and the manufacturing process of the thin-film magnetic head is completed.

It can be understood that when the method for removing smear according to the present invention is applied to the manufacturing method of the thin-film magnetic head like this, smear can be removed without going through the process which requires special adjustment and costs labor.

Figure 9:
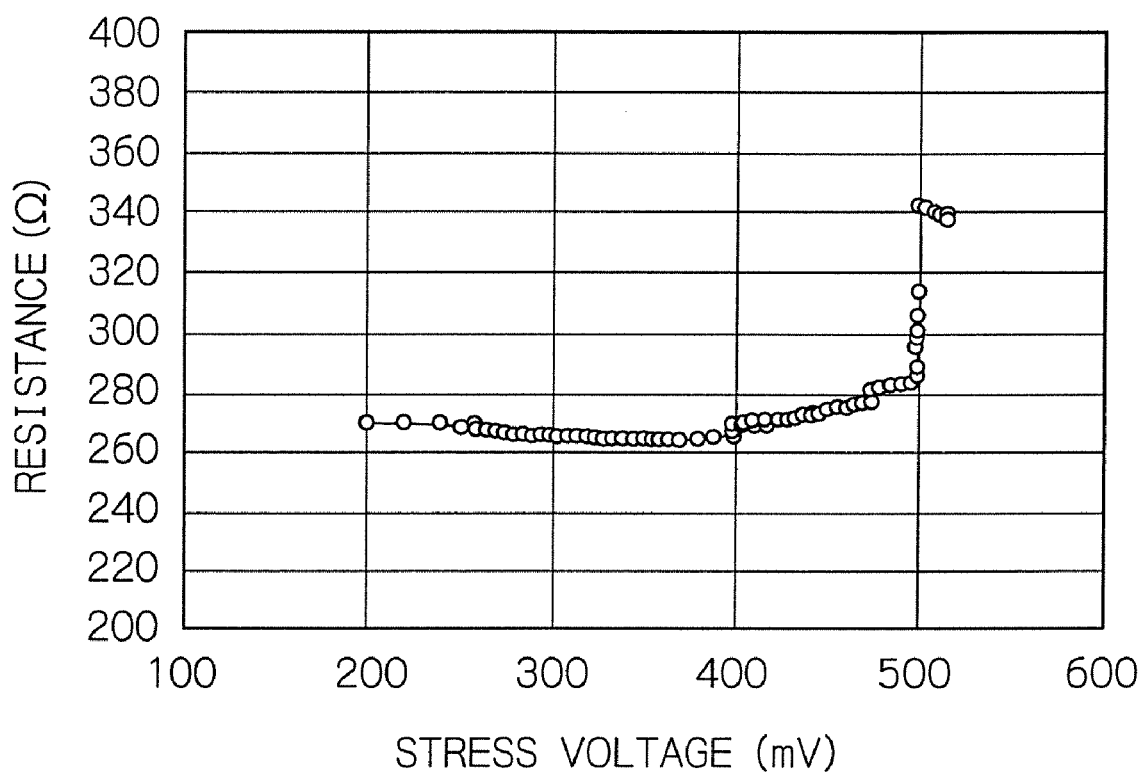
FIG. 9 shows a graph showing a practical example in which removing of smear is performed for the thin-film magnetic head where the smear occurs.

FIG. 9 shows a graph showing a practical example in which removing of smear is performed for the thin-film magnetic head where the smear occurs. In this case, the thin-film magnetic head includes the TMR effect element in which the tunnel barrier layer is $Al_2O_3$. In FIG. 9, the horizontal axis is the stress voltage, and the vertical axis is the electric resistance of the TMR effect element.

As the present practical example, used was the thin-film magnetic head in the magnetic recording/reproducing apparatus of which read operations became poor. The electric resistance value of the MR effect element of this head was 270.0 Ω. Here, 93% of the electric resistance value 346.3 Ω at the early stage before the read operations became poor, that is, 322.1 Ω was determined as the lower limit specified value as obtained from FIG. 6e. Under the determination, it was found out that the electric resistance value 270.0 Ω became significantly smaller than the lower limit specified value. Thereby, it was judged that smear occurred. Thus, a stress voltage in a pulse form with a pulse width of 1 second was applied between the signal electrodes of the MR effect element, and the pulse voltage value was gradually increased.

According to FIG. 9, when the pulse voltage reached 500 mV, the electric resistance value of the MR effect element was significantly restored. Here, 97.8% of the electric resistance value 346.3 Ω at the early stage before the read operations became poor, that is, 338.7 Ω was determined as the upper limit specified value, as obtained from FIG. 6c. Under the determination, the electric resistance value 344.3 Ω when the pulse voltage reached 500 mV exceeded the upper limit specified value. Thereby, it was confirmed that smear was burned off and removed.

From the above, it is understood that the method for removing smear according to the present invention, and the magnetic recording/reproducing apparatus with the function of removing smear are very effective for detecting smear and further removing the smear.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for removing smear in a thin-film magnetic head including a magnetoresistive effect element for reading data having two electrode layers sandwiching a magnetoresistive effect multilayer as a magneto-sensitive portion therebetween, comprising the step of applying a stress voltage less than a breaking voltage of said magnetoresistive effect element between said two electrode layers to burn off smear.

2. The method for removing smear as claimed in claim 1, wherein said stress voltage is applied while an electric resistance or an output voltage of said magnetoresistive effect element is measured, and said stress voltage is increased until the value of said electric resistance or said output voltage reaches an upper limit specified value specified from a value of an electric resistance or an output voltage in a normal case where smear is not present.

3. The method for removing smear as claimed in claim 2, wherein when a nonmagnetic intermediate layer of said magnetoresistive effect element includes alumina, said upper limit specified value is set to be a value which is at least 97.8% of said value of the electric resistance or the output voltage in the normal case where smear is not present.

4. The method for removing smear as claimed in claim 2, wherein when a nonmagnetic intermediate layer of said magnetoresistive effect element includes alumina, said stress voltage is set to be 515 mV or less.

5. The method for removing smear as claimed in claim 2, wherein when a nonmagnetic intermediate layer of said magnetoresistive effect element includes magnesia, said upper limit specified value is set to be a value of at least 97.3% of said value of the electric resistance or the output voltage in the normal case where smear is not present.

6. The method for removing smear as claimed in claim 2, wherein when a nonmagnetic intermediate layer of said magnetoresistive effect element includes magnesia, said stress voltage is set to be 527 mV or less.

7. The method for removing smear as claimed in claim 1, wherein the method further comprises the step of measuring an electric resistance or an output voltage of said magnetoresistive effect element before applying said stress voltage, and said stress voltage is applied between said two electrode layers of the magnetoresistive effect element when a value of the measured electric resistance or output voltage is smaller than a lower limit specified value specified from a value of an electric resistance or an output voltage in a normal case where smear is not present.

8. The method for removing smear as claimed in claim 7, wherein said lower limit specified value is set to be a value of 93% of said value of the electric resistance or the output voltage in the normal case where smear is not present.

9. The method for removing smear as claimed in claim 1, wherein said stress voltage is a continuous voltage which increases in value with time.

10. The method for removing smear as claimed in claim 1, wherein said stress voltage is a voltage in a pulse form.

11. A backup method of data, using a thin-film magnetic head which includes a magnetoresistive effect element for reading data having two electrode layers sandwiching a magnetoresistive effect multilayer as a magneto-sensitive portion therebetween, and cannot read data normally due to occurrence of smear, comprising the steps of:
applying a stress voltage less than a breaking voltage of said magnetoresistive effect element, and removing said smear by burning said smear off;
reading data by using the thin-film magnetic head from which smear is removed; and
storing the read data in a magnetic disk drive apparatus or a memory for backup.

12. A magnetic recording/reproducing apparatus, comprising:
at least one magnetic recording medium;
at least one head gimbal assembly in which a thin-film magnetic head is attached to an end portion of the head gimbal assembly itself, said thin-film magnetic head including a magnetoresistive effect element which is provided for reading data from said at least one magnetic recording medium and has two electrode layers sandwiching a magnetoresistive effect multilayer as a magneto-sensitive portion therebetween;
a voltage-applying and resistance-measuring circuit for applying a stress voltage for removing smear between said two electrode layers, and for measuring an electric resistance or an output voltage of said magnetoresistive effect element;
a judging circuit for judging necessity, a starting time or a finishing time of said stress voltage application, based on a measurement result of the electric resistance or the output voltage in said voltage-applying and resistance-measuring circuit; and
a controller for receiving the judgment result in said judging circuit, outputting information of a value of the electric resistance or the output voltage of said magnetoresistive effect element, error information due to smear and information of smear removing to an outside through an interface, and controlling the voltage-applying operation and the resistance-measuring operation of said voltage-applying and resistance-measuring circuit.

13. The magnetic recording/reproducing apparatus as claimed in claim 12, wherein said voltage-applying and resistance-measuring circuit applies said stress voltage while measuring an electric resistance or an output voltage between said two electrode layers, said judging circuit judges whether or not a value of the electric resistance or the output voltage reaches an upper limit specified value specified from a normal value of an initial electric resistance or output voltage, and said controller instructs said voltage-applying and resistance-measuring circuit to finish application of said stress voltage, when said controller receives judgment that the value of the electric resistance or the output voltage reaches said upper limit specified value.

14. The magnetic recording/reproducing apparatus as claimed in claim 13, wherein a nonmagnetic intermediate layer of said magnetoresistive effect element includes alumina, and said upper limit specified value is at least 97.8% of a value of an electric resistance or an output voltage in a normal case where smear is not present.

15. The magnetic recording/reproducing apparatus as claimed in claim 13, wherein a nonmagnetic intermediate layer of said magnetoresistive effect element includes alumina, and said stress voltage is 515 mV or less.

16. The magnetic recording/reproducing apparatus as claimed in claim 13, wherein a nonmagnetic intermediate layer of said magnetoresistive effect element includes magnesia, and said upper limit specified value is at least 97.3% of a value of an electric resistance or an output voltage of a normal case where smear is not present.

17. The magnetic recording/reproducing apparatus as claimed in claim 13, wherein a nonmagnetic intermediate layer of said magnetoresistive effect element includes magnesia, and said stress voltage is 527 mV or less.

18. The magnetic recording/reproducing apparatus as claimed in claim 12, wherein said voltage-applying and resistance-measuring circuit measures the electric resistance or the output voltage of said magnetoresistive effect element before applying said stress voltage, said judging circuit judges whether or not a value of the electric resistance or the output voltage is smaller than a lower limit specified value specified from a normal value of an initial electric resistance or output voltage, and said controller instructs said voltage-applying and resistance-measuring circuit to start application of said stress voltage when said controller receives judgment that the value of the electric resistance or the output voltage is smaller than said lower limit specified value.

19. The magnetic recording/reproducing apparatus as claimed in claim 18, wherein said lower limit specified value is a value of 93% of a value of an electric resistance or an output voltage in a normal case where smear is not present.

20. The magnetic recording/reproducing apparatus as claimed in claim 12, wherein said stress voltage which said voltage-applying and resistance-measuring circuit applies is a continuous voltage which increases in value with time.

21. The magnetic recording/reproducing apparatus as claimed in claim 12, wherein said stress voltage which said voltage-applying and resistance-measuring circuit applies is a voltage in a pulse form.

22. The magnetic recording/reproducing apparatus as claimed in claim 12, wherein said voltage-applying and resistance-measuring circuit applies said stress voltage between said two electrode layers of said magnetoresistive effect element which cannot read data due to occurrence of smear, and removes said smear, said magnetoresistive effect element from which smear is removed reads the data, and said controller transmits the read data to a magnetic disk drive apparatus or a memory for backup.

23. The magnetic recording/reproducing apparatus as claimed in claim 12, wherein the apparatus comprises a voltage-application switch connected to said voltage-applying and resistance-measuring circuit, for instructing said voltage-applying and resistance-measuring circuit to perform a voltage-applying operation or a resistance-measuring operation from an outside.

24. The magnetic recording/reproducing apparatus as claimed in claim 12, wherein said magnetoresistive effect element is a tunnel magnetoresistive effect element.

\* \* \* \* \*